United States Patent
McQuillen et al.

(10) Patent No.: US 9,920,699 B1
(45) Date of Patent: Mar. 20, 2018

(54) METHODS AND SYSTEM FOR EXHAUST GAS RECIRCULATION ESTIMATION VIA AN EXHAUST OXYGEN SENSOR

(71) Applicant: Ford Global Technologies, LLC, Dearborn, MI (US)

(72) Inventors: Michael McQuillen, Warren, MI (US); Gopichandra Surnilla, West Bloomfield, MI (US); Daniel A. Makled, Dearborn, MI (US); Richard E. Soltis, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/298,016

(22) Filed: Oct. 19, 2016

(51) Int. Cl.
*F02B 47/08* (2006.01)
*F02D 41/00* (2006.01)
*F02D 41/14* (2006.01)
*F02M 26/46* (2016.01)

(52) U.S. Cl.
CPC ..... *F02D 41/0072* (2013.01); *F02D 41/1454* (2013.01); *F02M 26/46* (2016.02); *F02D 2041/1472* (2013.01)

(58) Field of Classification Search
CPC ............. F02D 41/0072; F02D 41/1454; F02D 2041/1472; F02M 26/46
USPC .................... 123/672, 568.21; 701/108, 109; 73/114.73, 114.74
See application file for complete search history.

(56) References Cited

U.S. PATENT DOCUMENTS

| | | | |
|---|---|---|---|
| 6,321,732 B1 | 11/2001 | Kotwicki et al. | |
| 6,742,379 B2 | 6/2004 | Matsubara et al. | |
| 8,603,310 B2 * | 12/2013 | Ishida | G01N 27/419 123/703 |
| 9,376,968 B2 * | 6/2016 | Surnilla | G01M 15/104 |
| 9,797,323 B2 * | 10/2017 | Surnilla | F02D 41/0055 |
| 2015/0114346 A1 | 4/2015 | Surnilla et al. | |
| 2015/0240730 A1 | 8/2015 | Styles et al. | |
| 2016/0109422 A1 * | 4/2016 | Makled | G01N 33/0073 73/23.32 |
| 2016/0177853 A1 | 6/2016 | Uhrich et al. | |
| 2016/0245193 A1 | 8/2016 | Makled et al. | |
| 2016/0245204 A1 | 8/2016 | Makled et al. | |
| 2017/0082045 A1 * | 3/2017 | Makled | F02D 35/0007 |
| 2017/0107918 A1 * | 4/2017 | Hakeem | F02P 5/152 |
| 2017/0107949 A1 * | 4/2017 | Hakeem | F02D 19/0634 |

* cited by examiner

*Primary Examiner* — Hai Huynh
(74) *Attorney, Agent, or Firm* — Julia Voutyras; McCoy Russell LLP

(57) ABSTRACT

Methods and systems are provided for estimating an amount of exhaust gas recirculation (EGR) from an exhaust passage into an intake passage of an engine system by operating an exhaust oxygen sensor in a variable voltage (VVs) mode. In one example, a method includes during operation of an exhaust oxygen sensor in the VVs mode where a reference voltage of the exhaust oxygen sensor is adjusted from a lower, first voltage to a higher, second voltage, adjusting engine operation based on the EGR amount estimated based on an output of the exhaust oxygen sensor and a learned correction factor based on the second voltage. In this way, the exhaust oxygen sensor may be used to correct for variations arising due to changing fuel composition and ambient humidity and further used to estimate the amount of EGR being recirculated in the system, thereby enhancing engine fueling and EGR control.

20 Claims, 7 Drawing Sheets

METHODS AND SYSTEM FOR EXHAUST GAS RECIRCULATION ESTIMATION VIA AN EXHAUST OXYGEN SENSOR

FIELD

The present application relates generally to exhaust gas recirculation control based on an output of an exhaust gas sensor coupled to an exhaust system of an internal combustion engine.

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and enhance fuel economy. Specifically, the amount of EGR that is recirculated affects the NOx emissions and fuel economy. Increased exhaust gas recirculation may result in partial burning and misfires, thus, cause increased emissions, reduced driveability of the vehicle, and increased fuel consumption. Various sensors may be coupled in the engine system to estimate the amount of EGR being delivered to the engine. These may include, for example, various temperature, pressure, oxygen, and humidity sensors coupled to the engine intake manifold and/or the exhaust manifold.

One example approach for measuring EGR is shown by Kotwicki et. al. in U.S. Pat. No. 6,321,732. Therein, the EGR system includes pressure sensors mounted over a fixed orifice, where the pressure sensors are used to measure a change in pressure (e.g., delta pressure) across the orifice. The pressure sensors, referred to as delta pressure sensors, are used to measure the pressure difference across the orifice, which in turn is used to measure EGR and therefore control exhaust gas flow in the engine system. However, the delta pressure sensors are noisy, which in turn results in inaccurate EGR measurements that may result in the aforementioned issues. In addition, these sensors are installed in engine systems for the sole purpose of measuring EGR, thereby including such sensors n the engine systems may increase manufacturing cost.

Another example approach for measuring EGR is shown by Matsubara et al. in U.S. Pat. No. 6,742,379. Therein, the EGR system includes an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent.

However, the inventors have identified potential issues with such an approach. One or more other engine operating parameters are also affected by the misrepresentation of EGR by the intake oxygen sensor in the presence of rich or lean (relative to stoichiometry) EGR. For example, in the presence of lean EGR, although the sensor measures a lower (absolute) amount of EGR, the sensor output correctly reflects the burnt gas fraction. As a result, any adjustments to spark timing, throttle position, and/or fuel injection that are based on the adjusted calibration coefficient may be incorrect. As another example, in the presence of rich EGR, the sensor does not provide an accurate estimate of how much excess fuel is in the EGR. As such, if the excess fuel is not properly accounted for in cylinder fuel injection, the fuel injected will be higher than desired. This may cause open-loop fueling of the engine to be richer than desired. In the closed-loop fuel control, the adaptive fuel may adapt for the excess fuel in the EGR but the adaptive correction will be attributed to a fuel system error. This may falsely trigger a fuel system error if the correction is above a threshold. The problem may be exacerbated due to a delay between the timing of fuel injection and the sensing of the fuel at the intake oxygen sensor. As a result, engine fueling and EGR control may be disrupted.

In one example, some of the above issues may be addressed by a method comprising during operation of an exhaust oxygen sensor in a variable voltage (VVs) mode where a reference voltage of the exhaust oxygen sensor is adjusted from a lower, first voltage to a higher, second voltage, adjusting engine operation based on an exhaust gas recirculation (EGR) amount estimated based on an output of the exhaust oxygen sensor and a learned correction factor based on the second voltage. In this way, the exhaust oxygen sensor may be used for EGR estimation and engine fueling accordingly compensated.

As an example, the exhaust oxygen sensor may be operated in a reference mode wherein the sensor is operated at the lower voltage, and an output of the exhaust oxygen sensor may be used for controlling air-fuel-ratio (AFR). However, under select conditions, the exhaust oxygen sensor may be transitioned from the reference mode to the variable voltage (VVs) mode, where the sensor is operated at the higher voltage and/or modulated between the lower voltage and higher voltage. In some examples, the higher voltage is a voltage at which water molecules are partially or fully dissociated at the exhaust oxygen sensor while the lower voltage is a voltage at which water molecules are not dissociated at the sensor. As such, the select conditions may include an engine non-fueling condition such as a deceleration fuel shut-off (DFSO) and an engine steady-state condition such as engine idle. During such conditions, the exhaust oxygen sensor may generate an output, which may be used to estimate an exhaust water concentration from fuel ethanol content and ambient humidity. Specifically, the ambient humidity may be estimated by operating the exhaust oxygen sensor in VVs mode during DFSO, and the fuel ethanol content may be estimated during engine idle condition when there is no EGR. As such, the ambient humidity and the fuel ethanol content may be referred to as a correction factor, and may further be used to estimate the amount of water in the exhaust when EGR is inactive.

Subsequently, during engine idle conditions, EGR may be recirculated from the exhaust passage to the intake passage, and the exhaust sensor may be operated in the VVS mode to estimate the total water concentration in the exhaust. As such, the total water concentration may include an extra amount of water that directly correlates to the amount of EGR that is recirculated, for a given fuel composition, for example. Thus, by subtracting the correction factor from the total water concentration, the amount of EGR that is recirculated may be estimated.

In this way, the exhaust oxygen sensor may be used to correct for variations arising due to changing fuel composition and ambient humidity and further used to estimate the amount of EGR being recirculated in the system. By correcting the sensor output appropriately to compensate for the effects fuel composition and ambient humidity, a more accurate EGR estimation can be provided by the sensor, thereby improving engine fueling and EGR control. By extending the functionality of the exhaust oxygen sensor (which may be used for AFR estimation in the reference mode) in the VVs mode, the same sensor may be used to estimate all of fuel ethanol content, ambient humidity, and water concentration in the exhaust, thus eliminating the need for additional sensors for measuring each of these factors, and thus reducing manufacturing costs. It may be appreciated that the sensor may not be continuously operated in the VVs mode, but returned to the reference mode after estimating the correction and water levels during the select conditions. Thus, the integrity of the exhaust oxygen sensor may be maintained by reducing sensor degradation, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
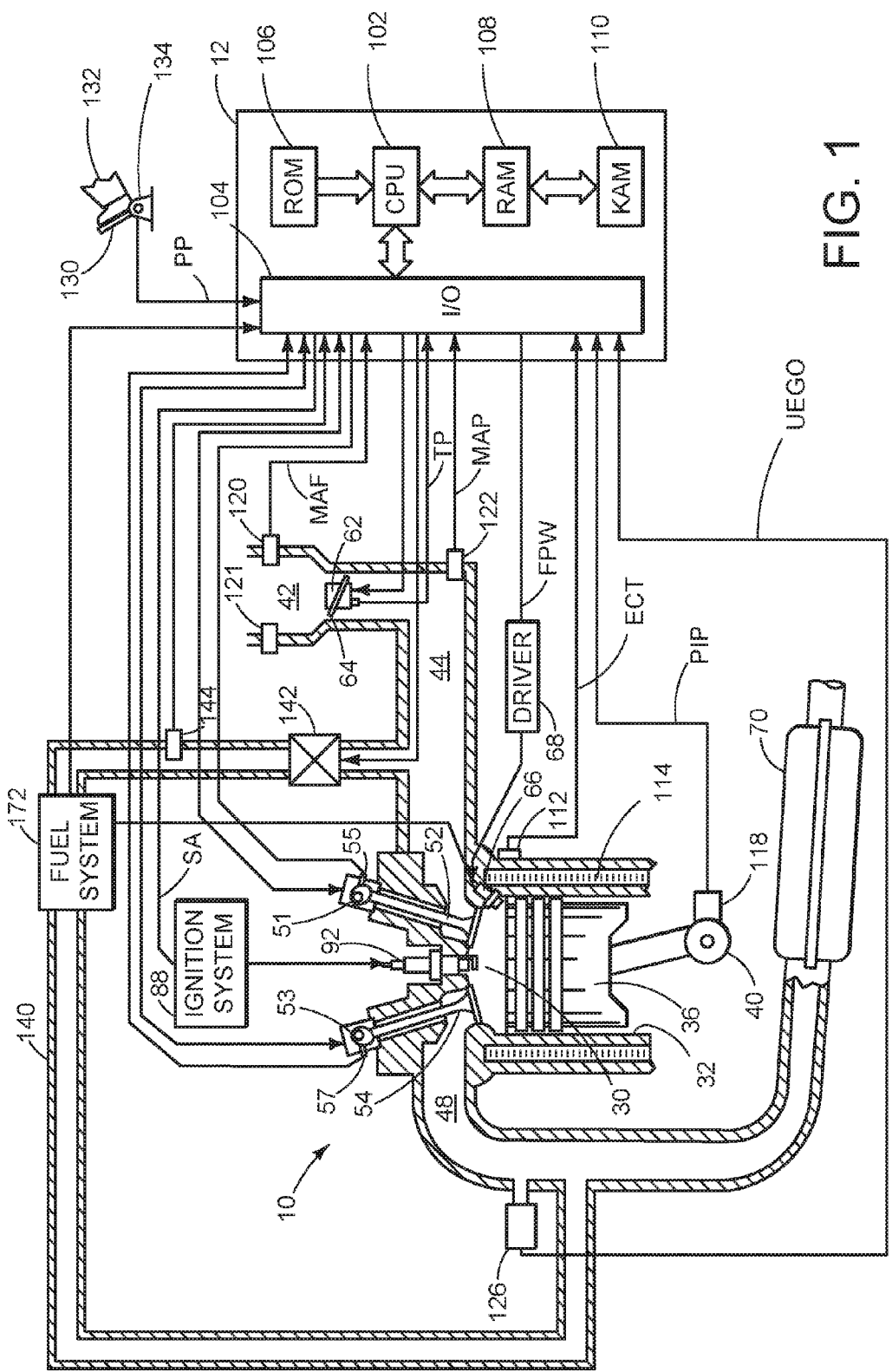
FIG. 1 shows a schematic diagram of an engine including an exhaust system and an exhaust oxygen sensor.
Figure 2:
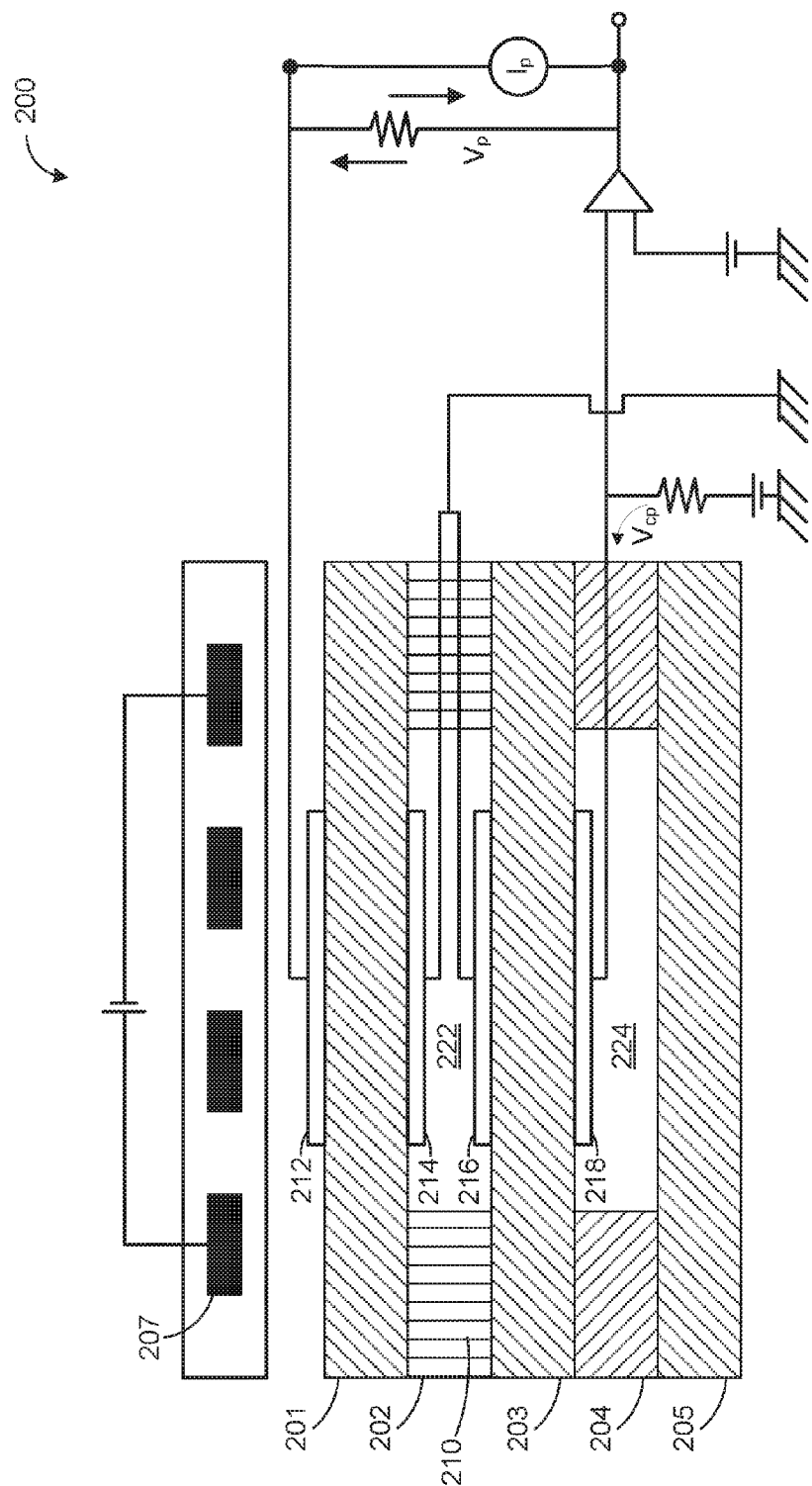
FIG. 2 shows a schematic diagram illustrating a reference mode and a variable voltage (VVs) mode operation of the exhaust oxygen sensor.
Figure 5:
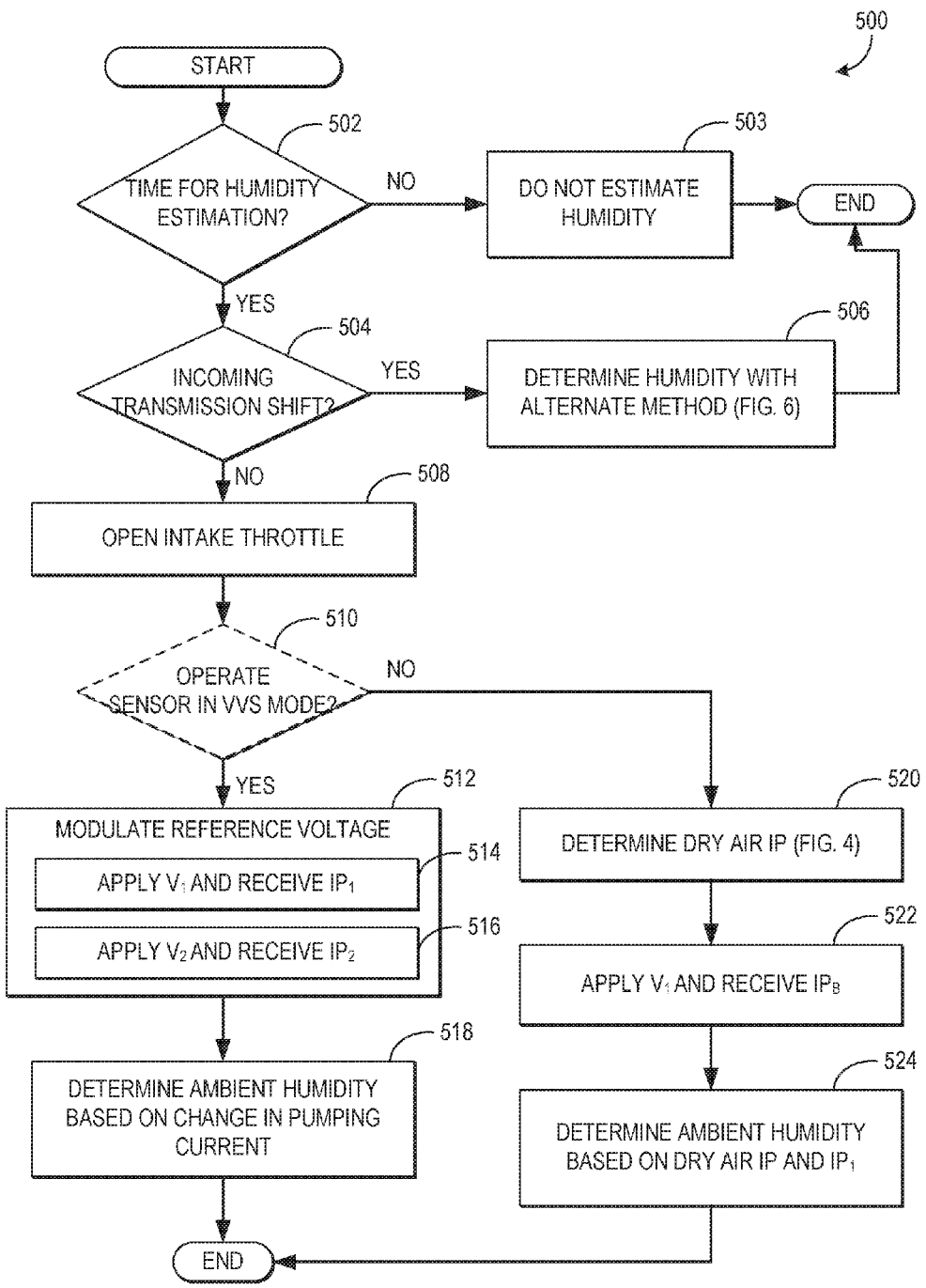
FIGS. 5-6 show flow charts illustrating example methods for estimating ambient humidity with the exhaust oxygen sensor operating in the VVs mode and further based on the estimated dry air pumping current.
Figure 6:
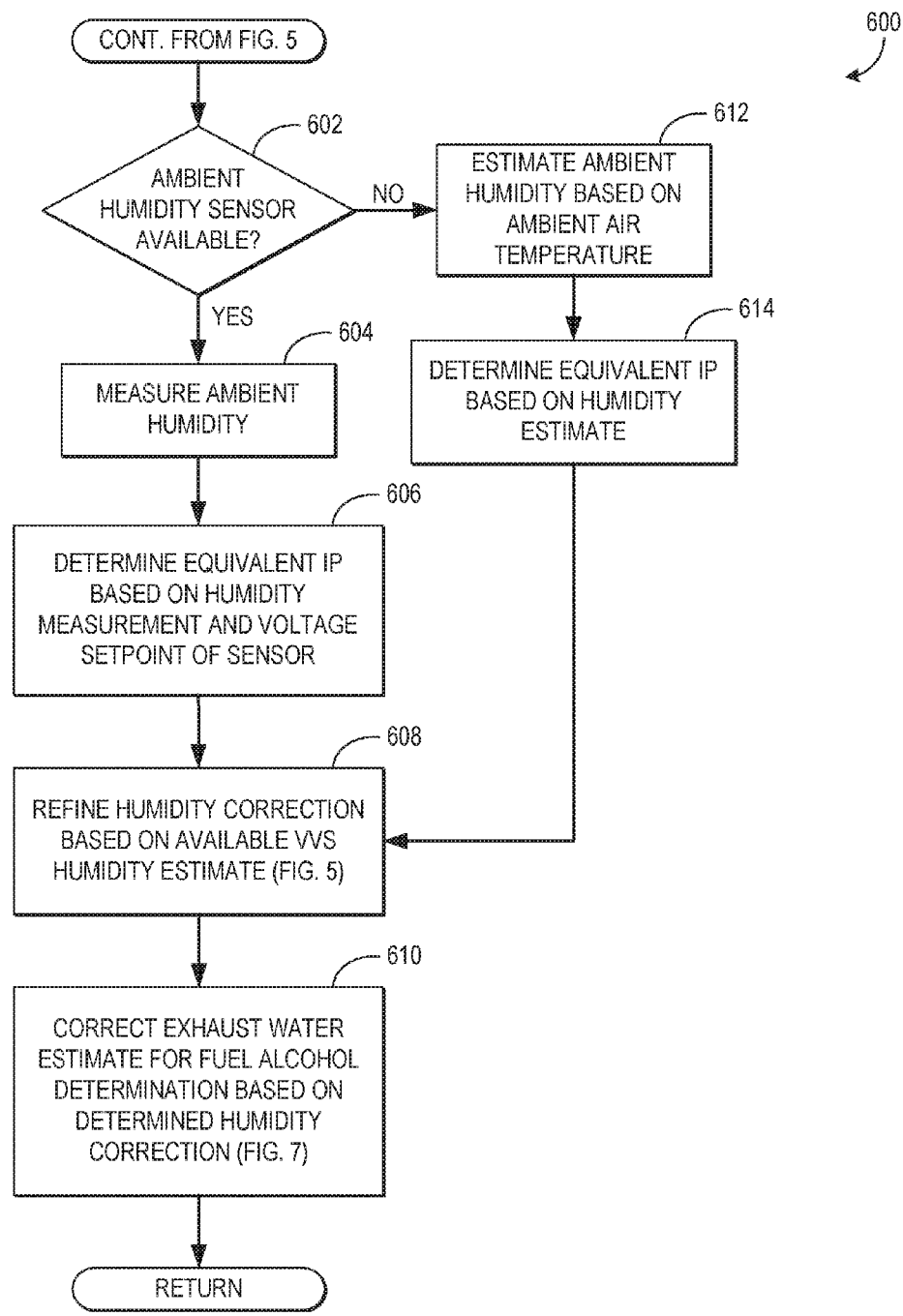
Figure 7:
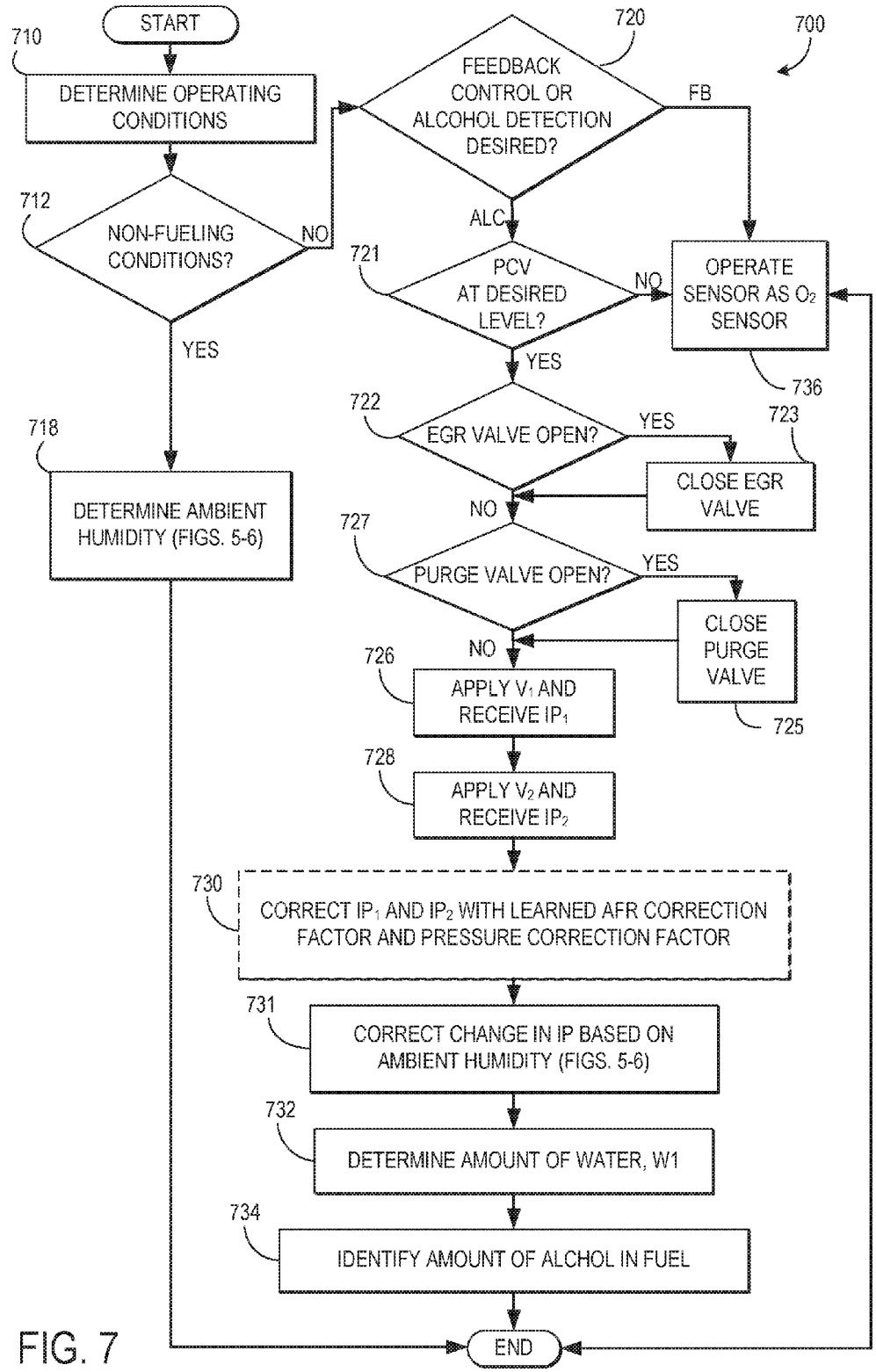
FIG. 7 shows a flow chart illustrating an example method for accurately estimating an amount of fuel ethanol content with the exhaust oxygen sensor operating in the VVs mode.

The following description relates to systems and methods for determining an amount of exhaust gas recirculation (EGR) based on outputs from an exhaust gas sensor, such as an oxygen sensor as shown in FIGS. 1-2 (referred to herein as an exhaust oxygen sensor). An engine controller may be configured to perform a control routine, such as the example method of FIG. 3 to determine if it is time for EGR estimation, and accordingly transition the sensor from a non-variable voltage mode to a variable voltage mode (VVs) mode. As such, the sensor may be normally operated in the non-VVs mode to estimate air-fuel-ratio (AFR), and transitioned to the VVs mode only if it is possible to operate the sensor in the VVs mode, and only under select operating conditions (e.g., engine non-fueling conditions, steady state conditions, etc.). In addition, the controller may estimate a correction factor based on the output of the sensor during the select operating conditions. In particular, the correction factor may including an ambient humidity correction estimated by operating the exhaust oxygen sensor in VVs mode during an engine non-fueling condition (FIGS. 5-6). Herein, the exhaust oxygen sensor may be operated in VVs mode to determine a dry air pumping current (FIG. 4) and the controller may estimate the ambient humidity based on the dry air pumping current (FIGS. 5-6). The correction factor may additionally include a fuel ethanol content correction, which is estimated by operating the exhaust oxygen sensor in the VVs mode during an engine steady-state condition as shown in FIG. 7. Together, the ambient humidity and the fuel ethanol content may be used to determine exhaust water concentration when there is no EGR recirculation. The controller may operate the sensor in VVs mode while flowing EGR during engine steady state condition, and estimate a total water concentration in the exhaust based on the output of the sensor. The controller may then determine the amount of extra water in the system when EGR is active by subtracting the ambient humidity and fuel ethanol content correction from the total water concentration. As such, this extra water is directly proportional to the amount of EGR being recirculated. In this way, an accurate measure of the amount of EGR in the system may be determined, thereby enhancing EGR control.

Referring now to FIG. 1, a schematic diagram showing one cylinder of multi-cylinder engine 10, which may be included in a propulsion system of an automobile, is illustrated. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Fuel tank in fuel system 172 may hold fuels with different fuel qualities, such as different fuel compositions. These differences may include different alcohol content, different octane, different heats of vaporization, different fuel blends, and/or combinations thereof etc. The engine may use an alcohol containing fuel blend such as E85 (which is approximately 85% ethanol and 15% gasoline) or M85 (which is approximately 85% methanol and 15% gasoline). Alternatively, the engine may operate with other ratios of gasoline and ethanol stored in the tank, including 100% gasoline and 100% ethanol, and variable ratios there between, depending on the alcohol content of fuel supplied by the operator to the tank. Moreover, fuel characteristics of the fuel tank may vary frequently. In one example, a driver may refill the fuel tank with E85 one day, and E10 the next, and E50 the next. As such, based on the level and composition of the fuel remaining in the tank at the time of refilling, the fuel tank composition may change dynamically.

The day-to-day variations in tank refilling can thus result in frequently varying fuel composition of the fuel in fuel system 172, thereby affecting the fuel composition and/or fuel quality delivered by injector 66. The different fuel compositions injected by injector 166 may herein be referred to as a fuel type. In one example, the different fuel compositions may be qualitatively described by their research octane number (RON) rating, alcohol percentage, ethanol percentage, etc.

It will be appreciated that while in one embodiment, the engine may be operated by injecting the variable fuel blend via a direct injector, in alternate embodiments, the engine may be operated by using two injectors and varying a relative amount of injection from each injector. It will be further appreciated that when operating the engine with a boost from a boosting device such as a turbocharger or supercharger (not shown), the boosting limit may be increased as an alcohol content of the variable fuel blend is increased. In one embodiment, an exhaust gas sensor 126 coupled to an exhaust passage 48 may be operated in a variable voltage (VVs) mode (FIG. 2) to estimate an amount of alcohol in the fuel injected to the engine (e.g., a fuel ethanol content estimation as shown in FIG. 7).

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. In one embodiment, the intake passage 42 may additionally include a humidity sensor 121 for measuring ambient humidity. In another embodiment, the humidity sensor 121 may additionally or alternatively be placed in the exhaust passage 48. In yet another embodiment, the exhaust gas sensor 126 may be operated in the VVs mode to estimate the ambient humidity as illustrated in FIGS. 5-6.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

The exhaust gas sensor 126 (e.g., exhaust oxygen sensor) is shown coupled to the exhaust passage 48 upstream of emission control device 70. Hereafter, the exhaust gas sensor 126 may be interchangeably referred to as exhaust oxygen sensor or exhaust sensor or sensor. Exhaust gas sensor 126 may be any suitable sensor for providing an indication of exhaust gas air-fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism. As such, the use of additional sensors to estimate EGR may add to the manufacturing costs of the engine systems.

The inventors have recognized that it is possible to operate the exhaust gas sensor 126 in a variable voltage (VVs) mode under various engine operating conditions to determine the amount of EGR that is recirculated from the exhaust passage into the intake passage. Herein, the exhaust gas sensor 126 that is normally operated in a non-variable voltage mode (also referred to as a reference mode) for measuring air-fuel ratio, may be used in a VVs mode to estimate the amount of EGR. In the non-VVs mode, the sensor is operated at a lower voltage, and the output of the sensor in non-VVs mode may be used for estimating AFR and in VVs mode, the sensor is operated between (e.g., modulated between and/or transitioned from the lower to the higher voltage) the lower voltage and a higher voltage (as described further below with reference to FIG. 2). As such, the output of the sensor in VVs mode may be used for estimating one or more of ambient humidity, fuel ethanol content, and a total water concentration in the exhaust as explained in detail with reference to FIGS. 3-7. In this way, by accounting for fuel ethanol content and ambient humidity, an accurate estimate the amount of EGR recirculated may be determined. As a result, EGR control may be enhanced, fuel economy may be increased, and NOx emissions may be reduced.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. The controller 12 receives signals from the aforementioned sensors and employs various actuators of FIG. 1 to adjust engine operation based on the received signals and instructions stored on a memory of the controller.

As one example, the controller may continue operating the exhaust gas sensor 126 in a non-VVs mode at a lower voltage to measure a degree of richness and leanness of the air-fuel ratio (AFR), and accordingly adjust fuel injection to the cylinders to maintain stoichiometric operation. As another example, during select engine operating conditions (such as engine non-fueling condition and steady state condition), the controller may transition the exhaust oxygen sensor from the non-VVs mode to VVs mode by increasing the operating voltage of the sensor from the lower voltage to a higher voltage. By operating the sensor at the higher voltage (and/or modulating the sensor between the lower and higher voltage), the controller may monitor the output of the sensor during select engine operating conditions. Based on the output, the controller may further estimate each of a fuel ethanol content, ambient humidity, and a total water content in the exhaust based on the output of the sensor during the select engine operating conditions (FIGS. 3-7).

For example, during a deceleration fuel shut-off (DFSO), the controller may transition the sensor from non-VVs mode to VVs mode to estimate ambient humidity, and then return the sensor back to non-VVs mode once the estimation is complete. The estimated ambient humidity may be stored in memory and may be retrieved later for the estimation of EGR. As another example, during an engine idle condition, the controller may actuate an EGR valve (such as EGR valve 142 of FIG. 1) to close the EGR valve in order to stop flow of EGR from exhaust passage into the intake passage. Additionally, the controller may operate the exhaust oxygen sensor in the VVs mode at the higher voltage to determine the fuel ethanol content. Once the estimation is complete, the controller may store the fuel ethanol content value in memory and may return the sensor to non-VVs operation mode, by operating the sensor at the lower voltage, and continuing estimation of AFR by operating the sensor in the non-VVs mode. As such, the ambient humidity and the fuel ethanol content may be a correction factor that may be used to estimate an amount of EGR. During the engine idle condition, when it is time for EGR estimation, the controller may actuate the EGR valve to open the EGR valve to recirculate EGR from the exhaust passage to the intake passage, and additionally operate the exhaust oxygen sensor in the VVs mode to determine a total water content in the exhaust. From the total water content in the exhaust, the controller may subtract the correction factor (e.g., contribution due to ambient humidity and fuel ethanol content), thus estimating the amount of EGR recirculated from the exhaust passage to the intake passage. In this way, the controller may determine the amount of EGR by operating the exhaust oxygen sensor selectively in VVs mode during select engine operating conditions.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Next, FIG. 2 shows a schematic view of an example embodiment of a UEGO sensor 200 configured to measure a concentration of oxygen (O2) in an exhaust gas stream. Sensor 200 may operate as exhaust gas sensor 126 of FIG. 1, for example. Sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments, a heater 207 may be disposed in thermal communication with the layers to increase the ionic conductivity of the layers. While the depicted UEGO sensor is formed from five ceramic layers, it will be appreciated that the UEGO sensor may include other suitable numbers of ceramic layers.

Layer 202 includes a material or materials creating a diffusion path 210. Diffusion path 210 is configured to introduce exhaust gases into a first internal cavity 222 via diffusion. Diffusion path 210 may be configured to allow one or more components of exhaust gases, including but not limited to a desired analyte (e.g., O2), to diffuse into internal cavity 222 at a more limiting rate than the analyte can be pumped in or out by pumping electrodes pair 212 and 214. In this manner, a stoichiometric level of O2 may be obtained in the first internal cavity 222.

Sensor 200 further includes a second internal cavity 224 within layer 204 separated from the first internal cavity 222 by layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping voltage, Vcp. Herein, second internal cavity 224 may be referred to as a reference cell.

A pair of sensing electrodes 216 and 218 is disposed in communication with first internal cavity 222 and reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean exhaust gas mixture, while a low oxygen concentration may be caused by a rich mixture.

A pair of pumping electrodes 212 and 214 is disposed in communication with internal cavity 222, and is configured to electrochemically pump a selected gas constituent (e.g., O2) from internal cavity 222 through layer 201 and out of sensor 200. Alternatively, the pair of pumping electrodes 212 and 214 may be configured to electrochemically pump a selected gas through layer 201 and into internal cavity 222. Herein, pumping electrodes pair 212 and 214 may be referred to as an O2 pumping cell.

Electrodes 212, 214, 216, and 218 may be made of various suitable materials. In some embodiments, electrodes 212, 214, 216, and 218 may be at least partially made of a material that catalyzes the dissociation of molecular oxygen. Examples of such materials include, but are not limited to, electrodes containing platinum and/or silver.

The process of electrochemically pumping the oxygen out of or into internal cavity 222 includes applying a voltage Vp (e.g., reference voltage) across pumping electrode pair 212 and 214. The pumping voltage Vp applied to the O2 pumping cell pumps oxygen into or out of first internal cavity 222 in order to maintain a stoichiometric level of oxygen in the cavity pumping cell. The resulting pumping current Ip is proportional to the concentration of oxygen in the exhaust gas. A control system (not shown in FIG. 2) generates the pumping current signal Ip as a function of the intensity of the applied pumping voltage Vp required to maintain a stoichiometric level within the first internal cavity 222. Thus, a lean mixture will cause oxygen to be pumped out of internal cavity 222 and a rich mixture will cause oxygen to be pumped into internal cavity 222.

It should be appreciated that the UEGO sensor described herein is merely an example embodiment of a UEGO sensor, and that other embodiments of UEGO sensors may have additional and/or alternative features and/or designs. The oxygen sensor of FIG. 2 may be a variable voltage oxygen sensor configured to operate at a first, lower voltage (e.g., reference voltage) where water molecules are not dissociated and a second, higher voltage (e.g., reference voltage) where water molecules are fully dissociated. As such, the second voltage is higher than the first voltage. Thus, the exhaust oxygen sensor may operate as a traditional oxygen sensor (e.g., air-fuel sensor), at only the lower, first reference voltage (e.g., approximately 450 mV). This lower voltage may be referred to herein as the base reference voltage. Said another way, the UEGO may be operated as an air-fuel sensor in order to determine an exhaust air-fuel ratio.

As elaborated below, the UEGO sensor of FIG. 2 can be advantageously used to estimate an amount of alcohol in the fuel burned in the engine as well as an ambient humidity and EGR. Under select engine operating conditions, the sensor may be operated in the VVs mode, wherein the sensor is operated at the second, higher voltage and/or modulated between the lower, first voltage and the second, higher voltage. Responsive to modulating the voltage of the exhaust oxygen sensor between the first and second voltages, first and second pumping currents may be generated. The first pumping current may be indicative of an amount of oxygen in a sample gas while the second pumping current may be indicative of the amount of oxygen in the sample gas plus an amount of oxygen contained in water molecules in the sample gas. The first and second pumping currents may be corrected based on AFR correction, pressure correction, and/or ambient humidity correction, and the corrected currents may then be used to estimate the fuel ethanol content as illustrated in FIG. 7.

The sensor may be operated in VVs mode to determine ambient humidity. As such, the ambient humidity (e.g., absolute humidity of the fresh air surrounding the vehicle) may be determined based on the first pumping current and the second pumping current (or the correction first and second pumping current). For example, the first pumping current may be subtracted from the second pumping current to obtain a change in pumping current indicative of the amount of oxygen from dissociated water molecules (e.g., the amount of water) in the sample gas. This value may be proportional to the ambient humidity.

The exhaust oxygen sensor may be operated in the VVs mode to estimate a total water concentration in the exhaust. In exemplary embodiments, the total water concentration in the exhaust may be estimated based on balancing and rearranging basic combustion equation (1) shown below:

$$(\text{Gasoline}+\text{EtOH})+(\text{Air}+\text{Humidity})+\text{EGR}=\text{CO2}+\text{H2O}+\text{N2} \tag{1}$$

where (Gasoline+EtOH) represents the fuel mixture, and EGR represents the amount of exhaust gas recirculated from the exhaust passage into the intake passage. The right side of equation (1) represents combustion products such as carbon dioxide (CO2), water (H2O), and nitrogen (N2). For an engine system that includes 100% gasoline, 0% humidity, and no EGR, and additionally including air composition, equation (1) can be simplified as shown in equation (2) below:

$$(\text{Gasoline})+(a\text{O2}+b\text{N2})=\text{CO2}+\text{H2O}+\text{N2} \tag{2}$$

where a and b are constants representing the air composition (a=20.95% and b=79.05%). Equation (1) can be rewritten as $$\text{C8H15}+y[z(\text{EGR})+(1-z)(a\text{O2}+b\text{N2})] \rightarrow 8\text{CO2}+u\text{H2O}+v\text{N2} \tag{3}$$

where y represents the amount of air required for stoichiometry, z represents the mol % humidity, u and v are mol % of exhaust H2O and exhaust N2 respectively.

Equation (2) can be further broken into chemical compositions and balanced as shown in equation (4) below:

$$\text{C8H15}+y(a\text{O2}+b\text{N2}) \rightarrow 8\text{CO2}+7.5\text{H2O}+y^*b\text{N2} \tag{4}$$

where C8H15 represents gasoline and y represents the amount of air required for stoichiometry. Thus, y*a=16+7.5 (e.g., balancing for oxygen in equation (3)), where a=0.2095. By solving for y, we get y=112.17, and substituting this value in equation (3), we get EGR as shown in equation (5):

$$\text{EGR}=8\text{CO2}+7.5\text{H2O}+112.12^*b\text{N2} \tag{5}$$

When EGR is recirculated, the combustion equations may be written as shown below:

$$(\text{C8H15})+y'(z(\text{EGR})+(1-z)(a\text{O2}+b\text{N2})) \rightarrow x\text{CO2}+u\text{H2O}+v\text{N2} \tag{6}$$

where y' is the mol % of total intake air required for stoichiometry (e.g., EGR+air), and x represents the mol % of EtOH. Substituting for EGR from equation (5) into equation (6), we get $$(\text{C8H15})+y'(z((8)\text{CO2}+(7.5)\text{H2O}+(112.17b)\text{N2})+(1-z)(a\text{O2}+b\text{N2})) \rightarrow x\text{CO2}+u\text{H2O}+v\text{N2} \tag{7}$$

The values of each of u, x, v, and y' may be estimated by balancing hydrogen, carbon, nitrogen, and oxygen as shown in equations (8) through (11):

$$u=7.5+(7.5)^*y'^*z \tag{8}$$

$$x=8+8^*y'^*z \tag{9}$$

$$v=(112.017)^*b^*y'^*z+y'^*b-y'^*b^*z \tag{10}$$

$$y'=(2X+u)/(23.5z+(1-z)^*2^*a) \tag{11}$$

Using these equations, the final or total water generated in mol % is given by equation (12):

$$[H2O]=u/x+u+v \tag{12}$$

where u represents the moles of H2O, and (x+u+v) represents the total moles.

In this way, the total water content in the exhaust may be estimated by operating the sensor in VVs mode to estimate the moles of H2O and the total moles, from which the total water concertation may be estimated. Herein, the total water content may include water concentration from ambient humidity, fuel ethanol content, and volume percent of EGR that is recirculated in the system. Thus, the amount of EGR recirculated may be estimated by subtracting the water content due to fuel ethanol content and ambient humidity from the total water content. In this way, the amount of EGR recirculated in the system may be accurately estimated.

The systems of FIGS. 1-2 provide for a system comprising: an exhaust gas recirculation (EGR) system including an EGR passage coupling an exhaust passage with an intake passage, the EGR passage including an EGR valve, an exhaust oxygen sensor configured to operate in a variable voltage mode, where a reference voltage of the exhaust oxygen sensor is adjusted from a lower, first voltage to a higher, second voltage, and coupled to the exhaust passage. Additionally or alternatively, the system includes a controller including computer readable instructions for: operating the exhaust oxygen sensor in the variable voltage mode while the EGR valve is closed to generate a first output, opening the EGR valve to circulate EGR and operating the exhaust oxygen sensor in the variable voltage mode to generate a second output, and adjusting engine operation based on an estimated amount of EGR, the estimated amount of EGR determined based on a difference between the second output and the first output (as shown in FIGS. 3-7). Additionally or alternatively, the controller may include further instructions for generating each of the first output and the second output during an engine idle condition. Additionally or alternatively, the controller may include further instructions for: operating the exhaust oxygen sensor in the variable voltage mode during an engine non-fueling condition and generating a third output of the exhaust oxygen sensor, and estimating ambient humidity based on the third output of the exhaust oxygen sensor and further based on a dry air pumping current output of the exhaust oxygen sensor. Additionally or alternatively, the controller may include further instructions for estimating the amount of EGR flowing in the engine based on a difference between the second output and each of the first and third. Additionally or alternatively, the controller may include further instructions for estimating the dry air pumping current based on ratio between a first pumping current generated when the exhaust oxygen sensor is operated at the first voltage, and a second pumping current of the exhaust oxygen sensor generated when the exhaust oxygen sensor is operated at the second voltage as shown below.

Figure 3:
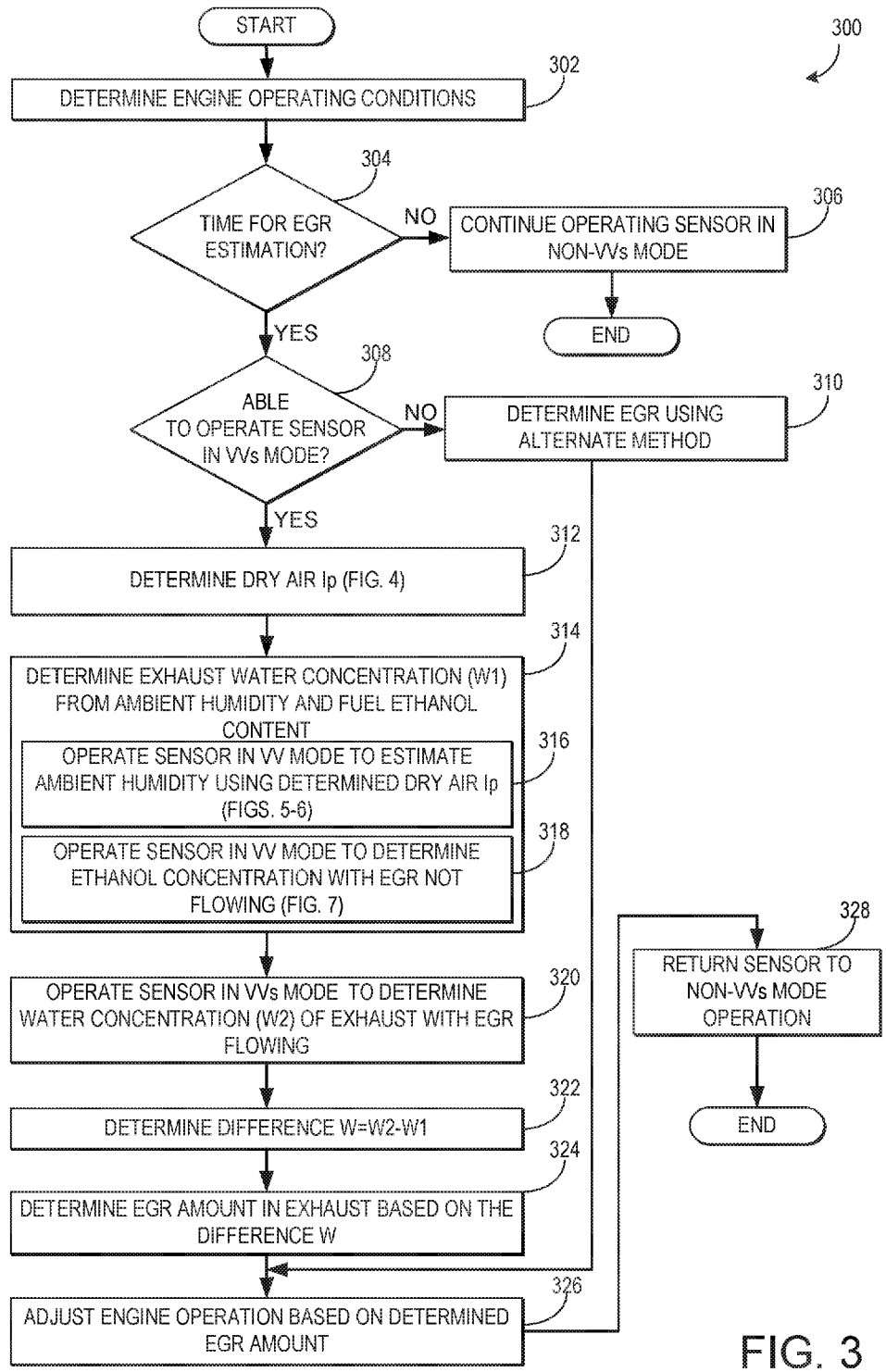
FIG. 3 shows a flow chart illustrating an example method for estimating an amount of exhaust gas recirculation (EGR) based on an output of the exhaust oxygen sensor in the VVs mode and further based on a learned correction factor, the learned correction factor including a fuel ethanol content correction and an ambient humidity correction.

Turning to FIG. 3, a method 300 is shown for adjusting engine operation based on an output of an exhaust oxygen sensor. Specifically, the exhaust oxygen sensor may be operated under select conditions (e.g., engine non-fueling conditions and engine steady-state conditions) to estimate each of a fuel ethanol content and ambient humidity. These estimates may be used as a correction factor and subtracted from a total amount of water estimated in the exhaust to determine an amount of exhaust gas circulation (EGR) circulated from an exhaust passage to an intake passage. As such, an engine operation may be adjusted based on the EGR estimation.

As illustrated below, a controller (such as controller 12 of FIG. 1) may operate the exhaust oxygen sensor (e.g., via sending one or more electrical control signals to the sensor) to determine an amount of exhaust gas recirculation (EGR) flowing in the engine based on a first output of an exhaust oxygen sensor during operation in a VVs mode, where a reference voltage of the exhaust oxygen sensor is adjusted from a lower, first voltage to a higher, second voltage, with EGR flowing and a second output of the exhaust oxygen sensor during operation in the VVs mode without EGR flowing. The controller may additionally adjust engine operation based on the determined amount of EGR. For example, the controller may actuate an EGR valve to open the valve to allow EGR to flow from the exhaust passage into the intake passage. While EGR is flowing, the controller may operate the exhaust oxygen sensor in the VVs mode and monitor the first output of the sensor. Then, the controller may close the EGR valve to stop EGR flowing from the exhaust passage into the intake passage. In addition, the controller may operate the sensor in VVs mode and monitor the second output of the sensor. Further, the controller may estimate a fuel ethanol content based on the second output of the exhaust oxygen sensor during a steady-state engine operating condition (e.g., engine idle) and infer a first water concentration in engine exhaust gases based on the estimated fuel ethanol content. Furthermore, the controller may estimate an ambient humidity based on a third output of the exhaust oxygen sensor while operating in the VVs mode during an engine non-fueling condition (e.g., DFSO), and further based on a dry air pumping current output of the exhaust oxygen sensor estimated. Further still, the controller may estimate a second water concentration in the exhaust based on the estimated ambient humidity. Finally, the controller may determine an amount of EGR flowing in the engine by subtracting each of the first water concentration and the second water concentration from a total water concentration in the exhaust, the total water concentration determined based on the first output of the exhaust oxygen sensor as shown below.

As described above, an exhaust oxygen sensor (such as exhaust gas sensor 126 shown in FIG. 1 and sensor 200 shown in FIG. 2) may be a variable voltage (VVs) sensor operable at a lower, base voltage and at a higher, target voltage. As such, the exhaust oxygen sensor may operate as a traditional air-fuel sensor where the reference voltage of the sensor is maintained at the lower, base voltage (e.g., approximately 450 mV) where water and carbon dioxide molecules are not dissociated at the sensor (referred to herein as non-VVs operation). Then, under select conditions, the reference voltage of the exhaust oxygen sensor may be increased from the lower, base voltage (e.g., first voltage) to a higher, target voltage (e.g., second voltage) where water molecules and/or carbon dioxide molecules are dissociated. In one example, the second voltage may be in a range of approximately 900-1100 mV. As such, each of a fuel ethanol content, ambient humidity, and a total water concentration may be estimated based on the output of the sensor in the VVs mode, under select conditions as described below.

Instructions for carrying out method 300 and the rest of the methods 400, 500, 600, and 700 included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

Method 300 begins at 302 by estimating and/or measuring engine operating conditions. Engine operating conditions may include engine speed and/or load, engine temperature, exhaust air-fuel ratio, ambient humidity, ambient temperature, mass air flow rate, exhaust gas recirculation (EGR) flow, etc. At 304, the method includes determining if it is time for EGR estimation. In one example, the controller may determine that it is time for EGR estimation if a threshold time has elapsed since a previous EGR estimation. In another example, the controller may determine it is time for EGR estimation if a refueling event has occurred recently or if a fuel composition is changed during refueling. Generally, EGR is shut off during when full power is demanded (e.g., during transient engine operating conditions), and opened once steady state is achieved. In one example, if the engine returns to a steady state after being in transient state for a threshold time, the controller may determine that it is time for EGR estimation. In another example, the controller may determine it is time for EGR estimation if the NOx emissions reach a threshold level. In some examples, EGR may be recirculated at part load conditions such as cruising (e.g., low to medium vehicle speeds) and at high load conditions (such as during trailer towing). During such operating conditions, the controller may determine that it is time for EGR estimation. In some other examples, an amount of EGR recirculated and a flow rate of EGR may be adjusted based on certain engine or engine operating conditions. While operating in such conditions, the controller may determine that it is time for EGR estimation. As one example, when an engine temperature is below a threshold temperature (e.g., engine cold start), EGR may be stopped or not recirculated. As another example, EGR flow rate may be adjusted based on humidity. As yet another example, EGR may be limited under conditions when the water may condense in the CAC. Typically, EGR may be flown at loads of 0.2 to 0.8. In some systems, EGR may be flown at very high load conditions to mitigate over-heating exhaust components. As such, when any of the aforementioned conditions occur, the controller may determine that it is time for EGR estimation.

If it is not time for EGR estimation (e.g., "NO" at 304), then method 300 continues to 306, wherein the controller continues to operate the exhaust oxygen sensor in the non-VVs mode (or reference mode). As described previously, the exhaust oxygen sensor may be operated at a lower voltage, and the output of the exhaust oxygen sensor may be used for controlling AFR. However, if it is time for EGR estimation (e.g., "YES" at 304), then method proceeds to 308 where the controller determines if the exhaust oxygen sensor is able to operate in the variable voltage (VVs) mode. For example, under some conditions when the exhaust oxygen sensor is being using for air fuel (A/F) control, the sensor may not be able to operate in the VVs mode. In such cases, A/F control may take priority over EGR estimate. However, it is possible for the EGR estimation to take priority over the A/F control. Some example situations where EGR estimation may take priority over A/F are discussed below.

During engine non-fueling conditions and steady state conditions, the sensor may be operated in VVs mode to determine the ambient humidity, the fuel ethanol concentration, and an amount of EGR recirculated in the system based on the water content estimated in the exhaust. As such, the EGR may be controlled with actuation of the EGR valve and comparing with calibrated EGR measurement sensors in intake (IAO2, delta pressure sensor, etc.). As such, all the variables (ambient humidity, fuel ethanol percentage, and EGR) would be known. Therefore, it would be possible to maintain VVs operation of the UEGO and still be able to keep A/F ratio control. This could be beneficial for many reasons. For example, one reason would be that the UEGO would not have to transfer from low to high voltage. As such, this may help save on the transition time between low and high voltage measurements. Additionally, this may reduce voltage overshoots, which would otherwise degrade (e.g., blacken) the exhaust oxygen sensor. Further, constant high voltage measurement would allow for a continuous measurement of all the variables that affect exhaust water concentration. For example, ethanol percentage may be continuously measured in this case since it is one of the variables that contributes to the exhaust water concentration. As a result, the exhaust oxygen sensor may be able to replace the in-line ethanol fuel sensor.

Another example situation where EGR measurement may take priority over A/F ratio measurement is if it is determined that the EGR lift valve needs recalibration (i.e., run a sweep concentration of EGR through the various lift valve angles and measure the resulting EGR at the exhaust oxygen using VVs and then store calibration data in table stored in memory of the controller).

Another example situation includes if an EGR measuring sensor such as a delta pressure sensor needs to be recalibrated and it is determined that the exhaust oxygen sensor would provide a more accurate EGR measurement to calibrate the sensor against. Entry conditions for this (in addition to the conditions of determining that the EGR valve or sensors need to be recalibrated) would be that the vehicle's AFR be in a steady state so that the vehicle may maintain that AFR while the exhaust oxygen sensor goes into open loop to calibrate the EGR valve or sensor.

As described above, VVs mode includes adjusting the reference voltage (also referred to herein as the pumping voltage) of the oxygen sensor from a lower, base voltage (e.g., approximately 450 mV) to a higher, target voltage where water molecules are dissociated at the sensor. In some examples, operating in VVs mode may include continuously modulating the reference voltage between the base voltage (e.g., first voltage) and the target voltage (e.g., second voltage). In some examples, continuously operating the oxygen sensor in VVs mode, and particularly at the higher, second voltage may degrade the sensor over time. Thus, it may be advantageous to reduce the amount of time the sensor spends operating in VVs mode. In one example, the sensor may only be operated in VVs mode if a duration has passed since a previous VVs operation period. In another example, the sensor may only be operated in VVs mode if a total duration of VVs mode operation for a period of engine use is below an upper threshold level. In yet another example, the sensor may operate in VVs mode based on a duration (e.g., amount of time elapsed) since a previous measurement. The sensor may also be turned off if a total threshold time has passed since a measurement. In another embodiment, continuously operating the oxygen sensor at the higher, second voltage may not degrade the sensor if the gas composition and second voltage are within certain threshold ranges that reduce degradation. In this embodiment, if the gas composition and second voltage of the sensor are maintained within their threshold ranges, the sensor may default to operating in VVs mode and the method may continue to 312.

Figure 4:
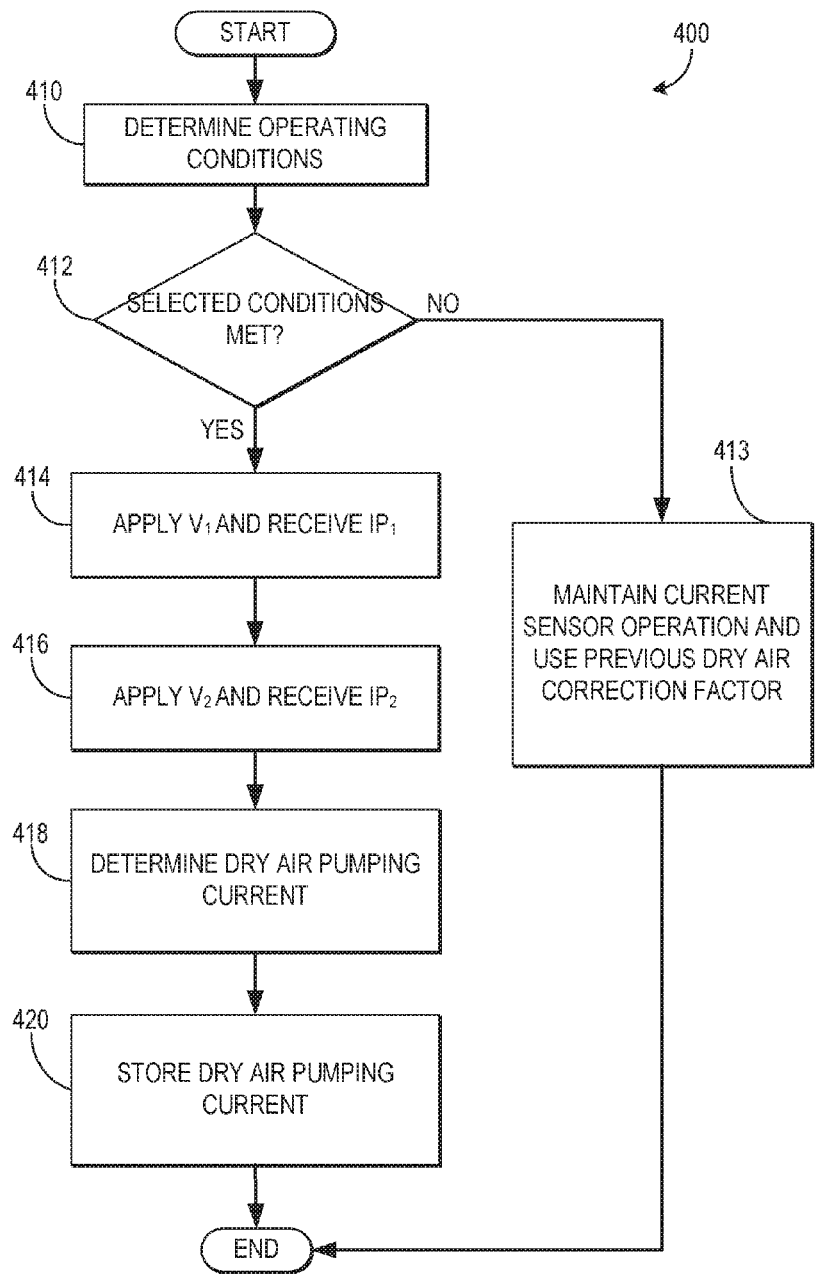
FIG. 4 shows a flow chart illustrating an example method for estimating a dry air pumping current with the exhaust oxygen sensor in VVs mode.

At 312, method 300 includes determining a dry air pumping current (Ip) by operating the sensor in VVs mode as illustrated in FIG. 4. Turning now to FIG. 4, a flow chart illustrating a method 400 for determining a dry air pumping current or dry air oxygen reading with an oxygen sensor, such as the oxygen sensor 200 described above with reference to FIG. 2, is shown. Specifically, the method 400 determines the dry air pumping current based on different voltages (e.g., reference voltages) applied to a pumping cell of the oxygen sensor during selected engine operating conditions. The resulting dry air pumping current may then be used along with subsequent oxygen sensor outputs during additional select operating conditions to estimate ambient humidity (FIGS. 5-6).

At 410 of method 400, engine operating conditions are determined. Engine operating conditions may include but are not limited to air-fuel ratio, amount of EGR entering the combustion chambers, and fueling conditions, for example.

Once the engine operating conditions are determined, method 400 continues to 412 where it is determined if selected conditions are met. For example, the selected conditions may include engine non-fueling conditions. Non-fueling conditions include vehicle deceleration conditions and engine operating conditions in which the fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake to the exhaust. In this way, a sensor, such as an exhaust oxygen sensor, may receive ambient air on which measurements, such as ambient humidity detection, may be performed.

As noted, non-fueling conditions may include, for example, deceleration fuel shut-off (DFSO). DFSO is responsive to the operator pedal (e.g., in response to a driver tip-out and where the vehicle decelerates greater than a threshold amount or a duration without operator pedal application). DSFO conditions may occur repeatedly during a drive cycle, and, thus, numerous indications of the ambient humidity may be generated throughout the drive cycle, such as during each DFSO event. As such, the fuel type may be identified accurately based on an amount of water in the exhaust gas despite fluctuations in humidity between drive cycles or even during the same drive cycle.

Further, the selected conditions at 412 may additionally include following an engine start or a duration of engine operation (e.g., after a number of travel miles, after a duration of engine operation, or after a number of engine cycles). For example, the selected conditions at 412 may include following an engine start (or after a duration of engine operation) during engine non-fueling conditions (e.g., when fueling is disabled as described above). In this way, learning the dry air oxygen reading (or dry air pumping current) as described further below may only occur periodically after each engine start or after a duration of engine operation when the flow of hydrocarbons past the oxygen sensor are reduced. In this way, a more accurate sensor reading may be obtained while reducing an amount of time of operating the oxygen sensor in VVs mode.

Continuing with FIG. 4, if it is determined that the selected operating conditions are not met (e.g., "NO" at 412), the method 400 continues to 413 to continue current oxygen sensor operation (at the current pumping voltage, such as at the base or lower, first reference voltage) and determine ambient humidity based on a previously determined dry air pumping current (e.g., dry air oxygen reading). For example, following each execution of method 400 where a dry air oxygen reading is determined, the resulting dry air oxygen reading (e.g., pumping current) value may be stored in a memory of the controller. Then, during ambient humidity estimation, for example, the most recently stored dry air pumping current may be looked up in the memory of the controller and used to determine ambient humidity. The method at 413 may include not operating the oxygen sensor in the VVs mode and instead continuing to operate the oxygen sensor at the lower, first reference voltage, also referred to herein as the base reference voltage. Operating the oxygen sensor at the base reference voltage may result in less sensor degradation than when operating the oxygen sensor at the higher, second reference voltage.

Conversely at 412, if is determined that selected operating conditions are met (e.g., "YES" at 412), method 400 continues to 414 where a first pumping voltage (V1) (e.g., first reference voltage) is applied to the oxygen pumping cell of the oxygen sensor and a first pumping current (Ip1) is received. The first pumping voltage may have a value such that oxygen is pumped from the cell, but low enough that oxygen compounds such as H2O (e.g., water) are not dissociated (e.g., V1=approximately 450 mV). For example, at the first pumping voltage, the oxygen sensor may not dissociate any water molecules. Application of the first voltage generates an output of the sensor in the form of the first pumping current (Ip1) that is indicative of the amount of oxygen in the sample gas. In this example, because the engine is under selected conditions (such as non-fueling conditions), the amount of oxygen may correspond to the amount of oxygen in the fresh air surrounding the vehicle, or a humid air oxygen reading.

Once the amount of oxygen is determined, method 400 proceeds to 416 where a second pumping voltage (V2) (e.g., reference voltage) is applied to the oxygen pumping cell of the oxygen sensor and a second pumping (Ip2) current is received. The second voltage may be greater than the first voltage applied to the sensor. In particular, the second voltage may have a value high enough to dissociate a desired oxygen compound. For example, the second voltage may be high enough to dissociate all H2O molecules into hydrogen and oxygen (e.g., V2=approximately 1.1 V). Application of the second voltage generates the second pumping current (I2) that is indicative of the amount of oxygen and water in the sample gas. It will be understood that the term "water" in the "amount of oxygen and water" as used herein refers to the amount of oxygen from the dissociated H2O molecules in the sample gas.

In one particular example, the second voltage (e.g., second reference voltage) may be 1080 mV, at which the water in the air is fully (e.g., completely) dissociated (e.g., 100% of the water in the air is dissociated at 1080 mV). This second voltage may be larger than a third, middle voltage where water in the air is partially dissociated (e.g., approximately 40% of the water in the air is dissociated). In one example, the third, middle voltage may be about 920 mV. In another example, the third, middle voltage may be about 950 mV. As an example, the sensor output at 920 mV may correspond to a dry air reading under a range of humidity conditions. The sensor output at 1.1 V may correspond to a humid air reading where all the water in the air has been dissociated at the sensor and the sensor output at 450 mV may correspond to a humid air reading where no water in the air has been dissociated. Thus, a dry air oxygen reading may be obtained by a ratio of oxygen sensor outputs when the oxygen sensor is operated at 450 mV and 1.1V. In an alternate embodiment, the dry air oxygen reading may be obtained by a ratio of oxygen sensor output when the oxygen sensor is operated at a voltage below 0.92 V where water is not dissociated (e.g., not even partially dissociated) and a voltage above 0.92 V where water is fully dissociated (e.g., 100% dissociated).

At 418, the dry air pumping current is determined based on the first pumping current and the second pumping current. For example, as described above, by operating the sensor at 450 mV (or a similar voltage where no water is dissociated at the sensor), a lower pumping current and oxygen reading may be obtained and by operating the sensor at 1080 mV (or a similar voltage where all water is dissociated at the sensor) a higher pumping current and oxygen reading may be obtained. A dry air pumping current indicative of a dry air oxygen reading may then be estimated from a ratio between the lower, first pumping current and the higher, second pumping current. For example, a sum of 40% of the higher, second pumping current and 60% of the lower, first pumping current may be substantially equal to the dry air pumping current and oxygen reading. In an alternate example, different percentages of the higher and lower pumping current may be added together to determine the dry air pumping current. For example, if the higher or lower voltage differ from 450 mV and 1080 mV, respectively, the corresponding percentages used to determine the ratio between the higher and lower pumping currents may differ proportionally.

The estimated dry air pumping current based on the ratio between the higher and lower pumping currents (e.g., higher and lower oxygen sensor outputs corresponding to the higher and lower voltages) may then be used to determine an ambient humidity estimate at 316 of method 300. For example, the method 400 at 420 may include storing the determined dry air pumping current value in a memory of the controller. Then, during the method of FIG. 3 (e.g., at step 316), the controller may either generate the dry air pumping current by executing the method 400 as described thus far or alternatively, the controller may simply look-up the most recently stored dry air pumping to determine an ambient humidity estimate as explained with reference to FIGS. 3 and 5-6. Further, the method at 420 may include updating a previously stored dry air pumping current with a new dry air current in the memory of the controller. For example, the stored dry air pumping current may be updated following each engine start.

Returning to FIG. 3, at 312, method 300 includes determining the dry air Ip current or retrieving the most recent dry air Ip value that is stored in memory (as illustrated in FIG. 4). Method 300 then proceeds to 314 where an exhaust water concentration (W1) from (e.g., due to) ambient humidity and fuel ethanol content is determined. Herein, the ambient humidity and the fuel ethanol content may each contribute a correction factor that is used to determine the exhaust water from ambient humidity and fuel ethanol content, W1.

As described previously, the controller may operate the exhaust oxygen sensor in the VVs mode to determine the exhaust water concentration W1. Estimating the exhaust water concentration W1 includes estimating ambient humidity under non-fueling engine condition at 316, and additionally estimating fuel ethanol concentration under steady-state condition at 318. Specifically, at 316, the controller may operate the exhaust oxygen sensor in VVs mode to determine ambient humidity using the dry air Ip estimated at 312 as illustrated in FIG. 5.

At 316, the method includes operating the exhaust oxygen sensor in the VVs mode to learn a correction factor based on the second voltage of the sensor. In one example, the learned correction factor may include an amount or percentage of water in the exhaust gas due to ambient humidity, which may be estimated based on an output of the exhaust oxygen sensor while operating in the VVs mode during an engine non-fueling condition (such as a deceleration fuel shut off) and based on a dry air pumping current output of the exhaust oxygen sensor. Briefly, the dry air pumping current may be estimated based on an output of the exhaust oxygen sensor while operating the exhaust oxygen sensor in the VVs mode during one or more of an engine start, a number of travel miles, an amount of time, a number of engine cycles, and the engine non-fueling condition.

At 318, the method additionally includes operating the exhaust oxygen sensor in the VVs mode to learn the correction factor based on the second voltage of the sensor. Herein, the learned correction factor may include an amount or percentage of water in the exhaust gas due to a fuel ethanol content while EGR is not flowing as illustrated in FIG. 7. As such, the fuel ethanol content may be estimated based on an output of the exhaust oxygen sensor during operation of the exhaust oxygen sensor in the VVs mode during a steady-state engine operation condition when EGR is off and not circulating from an exhaust passage to an intake passage. Herein, the steady-state engine operation condition may include an engine idle condition.

As explained below, methods 500, 600, and 700 may be nested within method 300. As such, the order in which the methods 500, 600, and 700 are performed within method 300 may be selected by the controller based on one or more of a current engine operating condition, and an ability to operate the sensor in VVs mode. In some examples, when the engine is a non-fueling condition (e.g., DFSO), the controller may choose not perform method 700; instead may perform methods 500 and 600 to estimate the ambient humidity and store the generated ambient humidity value in memory. However, if the engine is in a steady state, the controller may choose not perform methods 500 and 600; instead the controller may perform method 700 to estimate the fuel ethanol concentration. In either case, the values generated (ambient humidity or fuel ethanol content), may be used to determine an EGR amount. FIGS. 5-7 are described together below.

Turning now to FIG. 5, an example method 500 is shown for estimating ambient humidity with a VVs exhaust oxygen sensor (such as the exhaust oxygen sensor 126 shown in FIGS. 1 and 200 shown in FIG. 2). The method begins at 502 by determining if it is time for ambient humidity estimation. As such, if the engine is operating under non-fueling conditions, then the controller may determine that it is time for ambient humidity estimation and the method may continue to 504. In another example, method 500 may be executed after a duration, such as after a period of engine operation, a number of engine cylinders, a duration of vehicle travel, or after a distance of vehicle travel. In another example, method 500 may be executed upon engine start-up. If it is not time for ambient humidity estimation (e.g., "NO" at 502), the method continues to 503 to not estimate ambient humidity and the method ends. If an ambient humidity measurement is request from another control routine, the controller may look-up a previously stored ambient humidity estimate and returns to 318 of method 300.

Continuing with FIG. 5, at 504, method 500 includes determining if there is an incoming transmission shift. An incoming transmission shift may be predicted based on one or more of whether or not a shift request flag has been set, observation of one or more operator pedals, and/or vehicle acceleration. During transmission shifts following non-fueling conditions (e.g., deceleration fuel-shut off), humidity detection using the exhaust oxygen sensor may not be possible due to the need to decrease load during the transmission shift (and humidity detection using the exhaust oxygen sensor may include opening the throttle to reduce PCV noise). Thus, if a transmission shift is predicted at 504 ("e.g., "YES" at 504), the method continues to 506 to determine the ambient humidity using an alternate method, as shown at FIG. 6.

If there is not an incoming transmission shift predicted at 504 (e.g., "NO" at 504), method 500 continues on to 508 to open the intake throttle (e.g., throttle 62 shown in FIG. 1) to further reduce the amount of hydrocarbons flowing past the exhaust oxygen sensor (e.g., exhaust oxygen sensor 126 shown in FIG. 1 and/or 200 shown in FIG. 2). For example, opening the throttle may reduce the amount of hydrocarbons from PCV coming through the exhaust. More specifically, if the intake throttle is closed during the engine non-fueling condition, a large intake manifold vacuum is generated which can draw in positive crankcase ventilation (PCV) hydrocarbons. As such, even if a PCV port is closed during the DFSO, the vacuum may be sufficiently strong to draw in PCV hydrocarbons through the piston rings. The PCV flow drawn in may be aggravated in an aging engine due to leakage of PCV gases past the piston rings and valves. The ingested hydrocarbons may affect the output of the exhaust gas oxygen sensor and can confound the humidity measurements. In particular, the hydrocarbon effect leads to a sensor output that overestimates the ambient humidity.

At 510, the method optionally includes determining if the exhaust oxygen sensor should be operated in variable voltage (VVs) mode. In one example, if the controller arrives at 510 after performing method 300, step 510 may be considered redundant since a similar check is performed at 308 of method 300, and the controller may skip the check at 510, and continue to perform 512 through 518. However, if the controller performs method 500 independent of method 300, then the controller may check if the sensor is capable of operating in VVs mode at 510. As described above, VVs mode includes adjusting the reference voltage (also referred to herein as the pumping voltage) of the oxygen sensor from a lower, base voltage (e.g., approximately 450 mV) to a higher, target voltage where water molecules are dissociated at the sensor. In some examples, operating in VVs mode may include continuously modulating the reference voltage between the base voltage (e.g., first voltage) and the target voltage (e.g., second voltage). In some examples, continuously operating the oxygen sensor in VVs mode, and particularly at the higher, second voltage may degrade the sensor over time. Thus, it may be advantageous to reduce the amount of time the sensor spends operating in VVs mode. In one example, the sensor may only be operated in VVs mode if a duration has passed since a previous VVs operation period. In another example, the sensor may only be operated in VVs mode if a total duration of VVs mode operation for a period of engine use is below an upper threshold level. In yet another example, the sensor may operate in VVs mode based on a duration (e.g., amount of time elapsed) since a previous measurement. The sensor may also be turned off if a total threshold time has passed since a measurement. In another embodiment, continuously operating the oxygen sensor at the higher, second voltage may not degrade the sensor if the gas composition and second voltage are within certain threshold ranges that reduce degradation. In this embodiment, if the gas composition and second voltage of the sensor are maintained within their threshold ranges, the sensor may default to operating in VVs mode and the method may continue to 512.

If the controller determines that it is able operate the exhaust oxygen sensor in VVs mode, the method continues on to 512 to modulate the reference voltage of the exhaust oxygen sensor between the first voltage (V1) and the second voltage (V2). For example, the method at 512 includes first, at 514, applying the first voltage (V1) to the oxygen pumping cell of the exhaust gas sensor and a receiving the first pumping current (Ip1). The first reference voltage may have a value such that oxygen is pumped from the cell, but low enough that oxygen compounds such as H2O (e.g., water) are not dissociated (e.g., V1=approximately 450 mV). Application of the first voltage generates an output of the sensor in the form of the first pumping current (Ip1) that is indicative of the amount of oxygen in the sample gas. In this example, because the engine is under non-fueling conditions, the amount of oxygen may correspond to the amount of oxygen in the fresh air surrounding the vehicle. The method at 512 further includes, at 516, applying the second voltage (V2) to the oxygen pumping cell of the sensor and receiving a second pumping current (Ip2). The second voltage may be greater than the first voltage applied to the sensor. In particular, the second voltage may have a value high enough to dissociate a desired oxygen compound. For example, the second voltage may be high enough to dissociate H2O molecules into hydrogen and oxygen (e.g., V2=approximately 1.1 V). Application of the second voltage generates the second pumping current (I2) that is indicative of the amount of oxygen and water in the sample gas. It will be understood that the term "water" in the "amount of oxygen and water" as used herein refers to the amount of oxygen from the dissociated H2O molecules in the sample gas. In some examples, the first pumping current and the second pumping current may be corrected with a learned air-fuel ratio correction factor.

The ambient humidity (e.g., absolute humidity of the fresh air surrounding the vehicle) may be determined at 518 of routine 500 based on the first pumping current and the second pumping current (or the correction first and second pumping current). For example, the first pumping current may be subtracted from the second pumping current to obtain a change in pumping current indicative of the amount of oxygen from dissociated water molecules (e.g., the amount of water) in the sample gas. This value may be proportional to the ambient humidity.

Returning to 510, if operating the exhaust oxygen sensor in VVs mode is not desired, the method may instead include determining ambient humidity based on an output of the exhaust oxygen sensor at the first voltage and a dry air pumping current value. Specifically, the method at 520 includes determining a dry air pumping current. A method for determining a dry air pumping current of the exhaust oxygen sensor is presented at FIG. 4. The method may include operating the exhaust oxygen sensor at a first, lower voltage to obtain a first output which indicates a humid air oxygen reading. The sensor may then be operated at a second, higher voltage to obtain a second output which indicates a humid air oxygen reading wherein all the humidity in the air has dissociated at the oxygen sensor. A middle voltage between the first, lower voltage and the second, higher voltage may produce an oxygen sensor output indicative of a dry air oxygen reading wherein partial dissociation of the humidity occurs. A dry air oxygen reading may then be estimated by a ratio between the first output and the second output. In this way, the dry air oxygen reading may be determined by operating the oxygen sensor in VVs mode.

At 520, the controller may look up the most recently stored value of the dry air pumping current (determined by routine 800) to use at 520.

The method continues on to 522 to apply the first, lower reference voltage (e.g., base voltage, V1) to the exhaust oxygen sensor and a pumping current (IpB) is received. As such, the method at 522 includes not operating the oxygen sensor in VVs mode and instead maintaining the reference voltage of the sensor at a lower, base level that reduces oxygen sensor degradation. Said another way, the method at 522 includes not modulating the reference voltage of the oxygen sensor between a lower first voltage and a higher second voltage. The resulting pumping current may be indicative of the amount of oxygen in the sample gas.

The method then continues on to 524 to determine ambient humidity based on IpB (the pumping current determined at 522 during non-VVs sensor operation) and the dry air pumping current determined during method 400 (and looked up at 510). The amount of oxygen reduction due to the dilution effect of ambient humidity may then be determined based on the difference between the dry air pumping current and the pumping current IpB determined or retrieved at 522. By multiplying by a conversion factor, this difference may then be converted from a pumping current to a humidity percentage. In this way, by comparing the output of the oxygen sensor operating in non-VVs mode at the base reference voltage to a stored dry air pumping current value, ambient humidity may be determined with continuously operating the oxygen sensor in VVs mode. The ambient humidity value determined at 514 may then be used to correct the water estimate at 314 of method 300 and/or may be stored in the memory of the controller. In other examples, engine operation may be adjusted based on the determined ambient humidity.

Returning to 504 of method 500, if a transmission shift is predicted at 504, the method continues to 506 to determine the ambient humidity using an alternate method, as shown at FIG. 6. Continuing to FIG. 6 from 506, method 600 begins at 602 by determining if an ambient humidity sensor is available. For example, in one embodiment the engine may include a humidity sensor, such as humidity sensor 121 shown in FIG. 1, for directly measuring ambient humidity (e.g., measuring the humidity of the incoming intake air).

If an ambient humidity sensor is not available (e.g., the engine does not include a dedicated ambient humidity sensor), the method continues to 612 to estimate ambient humidity based on ambient air temperature. For example, ambient humidity may be estimated based on the ambient air temperature and a saturation vapor pressure estimated using an assumption of 50% relative humidity. Similar to the method at 606, at 614, an equivalent pumping current may be determined based on the humidity estimate. The method than continues on to 608, as described above. Estimating ambient humidity based on ambient air temperature may not be as accurate as using a dedicated humidity sensor or the variable voltage exhaust oxygen sensor. As such, when possible, the controller may preferentially determine humidity based on outputs of the VVs exhaust oxygen sensor, as described further below.

Conversely at 602, if an ambient humidity sensor is present and available for use, the method continues to 604 to measure ambient humidity with the humidity sensor. At 606, the method includes determining an equivalent pumping current, Ip, for an oxygen sensor based on the humidity measurement and a current voltage set point of the exhaust oxygen sensor used for fuel alcohol determination (FIG. 7). For example, the output of the humidity sensor may be used as an input to a look-up table stored in a memory of the controller. The look-up table may relate humidity measurements (e.g., raw humidity measurements from the humidity sensor) and oxygen sensor voltage to pumping current. In one example, the resulting pumping current may be used as the humidity correction for the water estimate for fuel ethanol determination in FIG. 7. The method may then continue to 608 to refine the humidity correction determined at 606 based on an available variable voltage humidity estimate, as described further below with continued reference to FIG. 5. For example, humidity estimates using the variable voltage exhaust oxygen sensor during non-fueling conditions when a transmission shift is not expected may be stored in the memory of the controller and used to further refine the humidity correction.

At 610, the method includes correcting the exhaust water estimate for fuel alcohol determination, based on the determined humidity correction. As such, the method at 610 may include subtracting the equivalent pumping current determined at 606 (or refined at 608) from the change in pumping current measurement. In this way, ambient humidity may be subtracted from the estimate of total water in exhaust gas before determining the percentage of ethanol in the fuel.

Continuing to FIG. 7, a flow chart illustrating an estimation method 700 for an exhaust oxygen sensor, such as UEGO 200 shown in FIG. 2, is shown. Specifically, method 700 determines an amount of alcohol in the fuel injected to the engine (e.g., fuel ethanol content estimate), based on voltages applied to a pumping cell of the sensor during selected engine fueling conditions and further based on a plurality of correction factors calculated as described with reference to FIGS. 3-6.

At 710 of method 700, engine operating conditions are determined. Engine operating conditions may include but are not limited to air-fuel ratio, amount of EGR entering the combustion chambers, and fueling conditions, for example.

Once the engine operating conditions are determined, method 700 continues to 712 where it is determined if the engine is under non-fueling conditions. Non-fueling conditions include vehicle deceleration conditions and engine operating conditions in which the fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake to the exhaust. In this way, a sensor, such as a UEGO sensor (e.g., exhaust oxygen sensor), may receive ambient air on which measurements, such as ambient humidity detection, may be performed.

As noted, non-fueling conditions may include, for example, deceleration fuel shut-off (DFSO). DFSO is responsive to the operator pedal (e.g., in response to a driver tip-out and where the vehicle accelerates greater than a threshold amount). DSFO conditions may occur repeatedly during a drive cycle, and, thus, numerous indications of the ambient humidity may be generated throughout the drive cycle, such as during each DFSO event. As such, the fuel type may be identified accurately based on an amount of water in the exhaust gas despite fluctuations in humidity between drive cycles or even during the same drive cycle.

Continuing with FIG. 7, if is determined that the engine is under non-fueling conditions such as DFSO, method 700 continues to 718 to determine ambient humidity using the methods of FIGS. 5-6, as described further below. Alternatively, if it is determined that the engine is not under non-fueling conditions, method 700 of FIG. 7 moves to 720 where is it determined if feedback air-fuel ratio control based on the sensor, or alcohol detection by the sensor, is desired or to be carried out. The selection may be based on operating conditions, such as a duration since a last determination of alcohol, or whether closed loop air-fuel ratio control is enabled. For example, if feedback air-fuel ratio control is disabled, the method may continue to determine alcohol content, whereas if feedback air-fuel ratio is commanded or enabled, the method may continue to perform such feedback air-fuel ratio control (without determining alcohol content). For example, if there is a request for VVs fuel ethanol content detection at step 316 of method 300, fuel alcohol detection may be selected over air-fuel ratio feedback control. If it is determined that feedback control is desired, method 700 moves to 736 and the sensor is operated as an oxygen (e.g., O2) sensor in non-VVs mode (e.g., at the lower, base voltage) to determine an oxygen concentration and/or air-fuel ratio of the exhaust gas and the method ends.

If alcohol detection is desired, method 700 proceeds to 721 where it is determined if positive crankcase ventilation (PCV) is at a desired level. In one example, a PCV level may be based on engine speed and/or turbocharger operation (e.g., boosted vs. non-boosted operation). For example, if the engine speed is high, it may be estimated that there may be increased PCV flow. Other example conditions include increased manifold vacuum, increased crankcase pressure, high ambient conditions, combinations thereof, etc. If the engine speed is relatively low, PCV level may be further based on if the turbocharger is on and the engine is boosted. If the engine is under non-boosted conditions, PCV flow may be increased. On the other hand, if the engine is boosted, the flow from the PCV valve may be sufficiently low. If it is determined at 721 that the amount of PCV is above a desired level (e.g., the PCV flow is high), method 700 moves to 736 and the sensor is operated as an oxygen sensor (in non-VVs mode) to determine an oxygen concentration of the exhaust gas for air-fuel control, for example, and the method ends.

On the other hand, if PCV is at a desired level (e.g., the PCV flow is low), method 700 continues to 722 where it is determined if the exhaust gas recirculation (EGR) valve is open. If it is determined that the EGR valve is open, method 700 moves to 723 and the EGR valve is closed. Once the EGR valve is closed at 723 or if it is determined that the EGR valve is closed at 722, and thus the amount of EGR entering the combustion chamber is substantially zero, method 700 proceeds to 724 where it is determined if the fuel vapor purge valve is open.

If it is determined that the fuel vapor purge valve is open, method 700 moves to 725 and the fuel vapor purge valve is closed. Fuel vapor that is stored in the fuel vapor canister may have an alcohol content that is different than the fuel that is currently in the fuel tank. As such, fuel vapor entering the combustion chamber may affect the amount of alcohol detected by the exhaust oxygen sensor (e.g., UEGO) resulting in an inaccurate estimate.

Once the fuel vapor purge valve is closed at 725 or if is determined that the fuel vapor purge valve is closed at 724, method 700 continues to 726 where a first pumping voltage (V1) (e.g., also referred to herein as reference voltage) is applied to the exhaust gas sensor and a first pumping current (Ip1) is received. The first pumping voltage may pump oxygen from the oxygen pumping cell, but may have a low enough value so as to not dissociate water (e.g., H2O) molecules in the pumping cell (e.g., V1=approximately 450 mV). In some examples, the first pumping voltage applied to the sensor at 726 may be the same as the first pumping voltage applied to the sensor during non-VVs mode operation. When the first voltage is applied to the pumping cell, the first pumping current (Ip1) is generated. In this example, because fuel is injected to the engine and combustion is carried out, the first pumping current may be indicative of an amount of oxygen in the exhaust gas.

At 728 of method 700, a second pumping voltage (V2) (e.g., also referred to herein as the second reference voltage) is applied to the pumping cell of the exhaust gas sensor and a second pumping current (Ip2) is received. The second pumping voltage may be greater than the first pumping voltage, and the second voltage may be high enough to dissociate oxygen compounds such as water molecules. Application of the second pumping voltage across the oxygen pumping cell generates the second pumping current (Ip2). The second pumping current may be indicative of an amount of oxygen and water in the sample gas (e.g., oxygen that already exists in the sample gas plus oxygen from water molecules dissociated when the second pumping voltage is applied).

Optionally, at 730, the first pumping current and the second pumping current may be corrected with a learned air-fuel ratio correction factor. For example, the learned air-fuel ratio correction may be determined at 720 of method 700 described below with reference to FIG. 7. Also at 730, the first pumping current and the second pumping current may be optionally corrected for pressure and the water vapor environment.

Continuing to 731, the method includes correcting the change in pumping current (e.g., the difference between the first and second pumping currents) between the two voltages based on ambient humidity. For example, ambient humidity may be subtracted from the change in pumping current which is indicative of a total amount of water in the exhaust (including humidity). In one example, the ambient humidity may be determined based on output of the exhaust oxygen sensor during non-fueling conditions. In another example, the ambient humidity may be determined using an alternate method based on engine operating conditions. The method at 731 may include instantaneously determining the ambient humidity or looking up a most recent ambient humidity estimate in the memory of the controller. The method for determining ambient humidity is described with reference to FIGS. 5-6.

Once the first and second pumping currents are generated and corrected based on various learned correction factors, an amount of water W1 in the sample gas may be determined at 732 of method 700 in FIG. 7. For example, the first pumping current may be subtracted from the second pumping current, and then corrected based on the air-fuel ratio correction factor, the pressure correction factor, and/or ambient humidity to determine a value that corresponds to an amount of water.

Finally, the amount of alcohol in the fuel (e.g., referred to herein as the fuel ethanol content), may be identified at 734. For example, the amount of water in the exhaust gas may be proportional to an amount of alcohol (e.g., a percent of ethanol) in the fuel injected to the engine. In some embodiments, the computer readable storage medium of the control system receiving communication from the sensor may include instructions for identifying the amount of alcohol. For example, a relationship between water after combustion (e.g., percent of water in exhaust gas) and the percent of ethanol in the fuel that may be stored on the computer readable storage medium in the form of a lookup table, for example. As the amount of ethanol in the fuel increases, the amount of water in the exhaust gas increases.

Thus, based on exhaust oxygen sensor outputs (e.g., pumping currents) generated by two different voltages applied sequentially to the oxygen pumping cell of the exhaust gas sensor during engine fueling conditions and the various correction factors described above, amounts of water in the exhaust gas may be determined. In this manner, an accurate indication of the amount of alcohol (e.g., percent ethanol) in the fuel may be identified.

Returning to FIG. 3, the values of ambient humidity (FIGS. 5-6) and fuel ethanol concentration (FIG. 7) generated by the controller may be used to determine the water concentration W1 at 314. Next, at 320, method 300 includes operating the sensor in VVs mode to determine a water concentration W2 (e.g., total water concentration) in the exhaust gas with EGR flowing. Specifically, the controller may open the EGR valve (e.g., EGR valve 142 shown in FIG. 1) to allow EGR to recirculate from the exhaust passage (e.g., exhaust passage 48 of FIG. 1) into the intake passage (e.g., intake passage 44 of FIG. 1). Thus, the output of the exhaust oxygen sensor is obtained while EGR is flowing from the exhaust passage to the intake passage, where the exhaust oxygen sensor is disposed in the exhaust passage, upstream of where the EGR passage couples to the exhaust passage.

Additionally, the controller may operate the exhaust oxygen sensor in the VVs mode to determine the water concentration W2 of the exhaust. Herein, the water concentration W2 may be a total water concentration in the exhaust and may further include water concentration from each of the ambient humidity, the fuel ethanol content, and water contributed from the EGR recirculating in the system (W). Mathematically, the total water concentration W2 can be written as equation (13) below:

$$W2=W1+W \qquad (13)$$

where W1 represents the water concentration from each of the ambient humidity and the fuel ethanol content. As such, the water contribution from each of the ambient humidity and the fuel ethanol content may be regarded as a correction factor that is learned by the controller by operating the sensor in VVs mode by performing methods illustrated in FIGS. 5-7 under select engine operating conditions.

Hereafter, W2 may be interchangeably referred to as the correction factor. Specifically, the ambient humidity may be estimated using dry air pumping current (FIG. 4) during engine non-fueling conditions (e.g., DFSO), and the fuel ethanol content may be estimated during engine steady state condition (e.g., idle).

Next, at 322, the water contributed from the EGR recirculating in the system (W) is determined by subtracting the correction factor from the total water concentration W2 in the exhaust, as shown in equation (14):

$$W=W2-W1 \qquad (14)$$

Method 300 includes estimating an EGR amount in the exhaust based on the difference W at 324. Thus, the method includes determining the total water concentration in exhaust based on the output of the exhaust oxygen sensor and determining a water concentration in exhaust due to humidity and a fuel ethanol content based on the learned correction factor and estimating the EGR amount by subtracting the water concentration in exhaust due to humidity and fuel ethanol content from the total water concentration. Additionally, the controller may store the EGR amount estimated using equation (14) in memory. In some examples, the controller may adjust the EGR amount based on additional factors. For example, the controller may factor in how much the AFR is rich vs. lean when taking the VVs measurement of exhaust composition, and accordingly adjust the EGR estimate. In some other examples, transportation delay from when the EGR recirculation valve is open until when the exhaust oxygen sensor will see the additional contribution in water may be an additional factor that may be used to discern the contribution in water from EGR. In such examples, the method may include comparing before and after the EGR contribution that is detected by the exhaust oxygen sensor.

In this way, the controller may operate the exhaust oxygen sensor in VVs mode to determine each of the ambient humidity, the fuel ethanol concentration, and an amount of EGR recirculated in the system based on the water content estimated in the exhaust.

As such, this estimation is feasible only when the exhaust oxygen sensor is operated in the VVs mode (as checked at 308). However, if it is not possible to operate the sensor in VVs mode (e.g., "NO" at 308), method 300 proceeds to 310. At 310, method 300 includes determining EGR using alternate methods.

In one example, the controller may retrieve the most recent ambient humidity, fuel ethanol content values, and total water concentration in exhaust from memory, and further use these values to estimate the amount of EGR. In another example, the controller may use outputs from various sensors coupled to the engine system to estimate the amount of EGR being recirculated from the exhaust passage to the intake passage. Examples of the sensors include, but are not limited to, temperature sensors, pressure sensors, flow sensors, position sensors, and gas composition sensors.

Irrespective of whether the amount of EGR is determined by operating the exhaust oxygen sensor in VVs mode (at 312 through 324) or by alternate methods (310), once the controller determines the amount of EGR, method 300 proceeds to 326.

At 326, method 300 includes adjusting engine operation based on the determined EGR amount. For example, the controller may adjust engine fueling based on the amount of EGR that is estimated. In one example, the controller adjusts the amount of fuel injection based on the amount of EGR. For example, the controller may determine a control signal to send to the fuel injector actuator, such as a pulse width of the signal, being determined based on a determination of the EGR amount. The controller may determine the pulse width through a determination that directly takes into account a determined EGR amount, such as increasing the pulse width with increasing EGR. The controller may alternatively determine the pulse width based on a calculation using a look-up table with the input being EGR amount and the output being pulse-width.

Method continues to 328, where method 300 includes returning the exhaust oxygen sensor to the non-VVs mode operation. Returning the sensor to the non-VVs mode includes operating at a lower voltage, and using the output of the sensor in non-VVs mode for estimating AFR, for example. Thus, the exhaust oxygen sensor may be operated at only the first voltage, in a non-variable voltage mode, in response to a request to determine an air-fuel ratio of the engine, and adjusting engine operation based on an estimated air-fuel ratio. Herein, the estimated air-fuel ratio is determined based on an output of the exhaust oxygen sensor operating in the non-variable voltage mode. Method 300 ends.

In this way, the exhaust oxygen sensor may be used for EGR estimation and engine fueling accordingly compensated. The technical effect of learning the correction factor to exhaust water concentration from fuel ethanol content and ambient humidity, and subtracting this from the total water concentration, is that the resulting difference is an accurate measure of EGR that is being recirculated from the exhaust passage into the intake passage. The accurate measure of EGR thus results in enhanced EGR control, further resulting in increased fuel economy and reduced NOx emissions.

The systems and methods described above provide for a method comprising during operation of an exhaust oxygen sensor in a variable voltage mode where a reference voltage of the exhaust oxygen sensor is adjusted from a lower, first voltage to a higher, second voltage, adjusting engine operation based on an exhaust gas recirculation (EGR) amount estimated based on an output of the exhaust oxygen sensor and a learned correction factor based on the second voltage. In a first example of the method, the method may additionally or alternatively include wherein the learned correction factor includes an estimated fuel ethanol content and further comprising estimating the fuel ethanol content based on an output of the exhaust oxygen sensor during operation of the exhaust oxygen sensor in the variable voltage mode during a steady-state engine operation condition when EGR is off and not circulating from an exhaust passage to an intake passage. A second example of the method optionally includes the first example, and further includes wherein the steady-state engine operation condition includes an engine idle condition. A third example of the method optionally includes one or more of the first and the second examples, and further includes wherein the learned correction factor further includes an ambient humidity. A fourth example of the method optionally includes one or more of the first through the third examples, and further includes estimating the ambient humidity based on an output of the exhaust oxygen sensor while operating in the variable voltage mode during an engine non-fueling condition and based on a dry air pumping current output of the exhaust oxygen sensor. A fifth example of method optionally includes one or more of the first through the fourth examples, and further includes estimating the dry air pumping current output based on an output of the exhaust oxygen sensor while operating the exhaust oxygen sensor in the variable voltage mode during one or more of an engine start, after a number of travel miles, after a duration of engine operation, after a number of engine cycles, and the engine non-fueling condition. A sixth example of method optionally includes one or more of the first through the fifth examples, and further includes wherein the engine non-fueling condition includes a deceleration fuel shut off. A seventh example of method optionally includes one or more of the first through the sixth examples, and further includes wherein the output of the exhaust oxygen sensor which the EGR amount estimate is based on, is obtained while EGR is flowing from an exhaust passage to an intake passage, where the exhaust oxygen sensor is disposed in the exhaust passage. An eighth example of method optionally includes one or more of the first through the seventh examples, and further includes determining a total water concentration in exhaust based on the output of the exhaust oxygen sensor and determining a water concentration in exhaust due to humidity and a fuel ethanol content based on the learned correction factor and estimating the EGR amount by subtracting the water concentration in exhaust due to humidity and fuel ethanol content from the total water concentration.

The systems and methods described above also provide for a method comprising determining an amount of exhaust gas recirculation (EGR) flowing in the engine based on a first output of an exhaust oxygen sensor during operation in a variable voltage mode, where a reference voltage of the exhaust oxygen sensor is adjusted from a lower, first voltage to a higher, second voltage, with EGR flowing and a second output of the exhaust oxygen sensor during operation in the variable voltage mode without EGR flowing, and adjusting engine operation based on the determined amount of EGR. In a first example of the method, the method may additionally or alternatively include estimating a fuel ethanol content based on the second output of the exhaust oxygen sensor during a steady-state engine operating condition and inferring a first water concentration in engine exhaust gases based on the estimated fuel ethanol content. A second example of the method optionally includes the first example, and further includes estimating ambient humidity based on a third output of the exhaust oxygen sensor while operating in the variable voltage mode during an engine non-fueling condition and based on a dry air pumping current output of the exhaust oxygen sensor, the dry air pumping current estimated during one or more of an engine start, after a number of travel miles, after a duration of engine operation, after a number of engine cycles, and the engine non-fueling condition. A third example of the method optionally includes one or more of the first and the second examples, and further includes inferring a second water concentration in the exhaust based on the estimated ambient humidity. A fourth example of the method optionally includes one or more of the first through the third examples, and further includes determining the amount of EGR flowing in the engine by subtracting each of the first water concentration and the second water concentration from a total water concentration in the exhaust, the total water concentration determined based on the first output of the exhaust oxygen sensor. A fifth example of method optionally includes one or more of the first through the fourth examples, and further includes operating the exhaust oxygen sensor at only the first voltage, in a non-variable voltage mode, in response to a request to determine an air-fuel ratio of the engine, and adjusting engine operation based on an estimated air-fuel ratio, the estimated air-fuel ratio determined based on an output of the exhaust oxygen sensor operating in the non-variable voltage mode.

The systems and methods described above provide for a system for an engine, comprising an exhaust gas recirculation (EGR) system including an EGR passage coupling an exhaust passage with an intake passage, the EGR passage including an EGR valve, an exhaust oxygen sensor configured to operate in a variable voltage mode, where a reference voltage of the exhaust oxygen sensor is adjusted from a lower, first voltage to a higher, second voltage, and coupled to the exhaust passage, and a controller including computer readable instructions for: operating the exhaust oxygen sensor in the variable voltage mode while the EGR valve is closed to generate a first output; opening the EGR valve to circulate EGR and operating the exhaust oxygen sensor in the variable voltage mode to generate a second output, and adjusting engine operation based on an estimated amount of EGR, the estimated amount of EGR determined based on a difference between the second output and the first output. In a first example of the system, the system may additionally or alternatively include wherein the controller includes further instructions for generating each of the first output and the second output during an engine idle condition. A second example of the system optionally includes the first example, and further includes wherein the controller includes further instructions for operating the exhaust oxygen sensor in the variable voltage mode during an engine non-fueling condition and generating a third output of the exhaust oxygen sensor; and estimating ambient humidity based on the third output of the exhaust oxygen sensor and further based on a dry air pumping current output of the exhaust oxygen sensor. A third example of the system optionally includes one or more of the first and the second examples, and further includes wherein the controller includes further instructions for estimating the amount of EGR flowing in the engine based on a difference between the second output and each of the first output and third outputs. A fourth example of the system optionally includes the first through the third examples, and further includes wherein the controller includes further instructions for estimating the dry air pumping current based on ratio between a first pumping current generated when the exhaust oxygen sensor is operated at the first voltage, and a second pumping current of the exhaust oxygen sensor generated when the exhaust oxygen sensor is operated at the second voltage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during operation of an exhaust oxygen sensor in a variable voltage mode where a reference voltage of the exhaust oxygen sensor is adjusted from a lower, first voltage to a higher, second voltage, adjusting engine operation based on an exhaust gas recirculation (EGR) amount estimated based on an output of the exhaust oxygen sensor and a learned correction factor based on the second voltage.

2. The method of claim 1, wherein the learned correction factor includes an estimated fuel ethanol content and further comprising estimating the fuel ethanol content based on an output of the exhaust oxygen sensor during operation of the exhaust oxygen sensor in the variable voltage mode during a steady-state engine operation condition when EGR is off and not circulating from an exhaust passage to an intake passage.

3. The method of claim 2, wherein the steady-state engine operation condition includes an engine idle condition.

4. The method of claim 1, wherein the learned correction factor further includes an ambient humidity.

5. The method of claim 4, further comprising estimating the ambient humidity based on an output of the exhaust oxygen sensor while operating in the variable voltage mode during an engine non-fueling condition and based on a dry air pumping current output of the exhaust oxygen sensor.

6. The method of claim 5, further comprising estimating the dry air pumping current output based on an output of the exhaust oxygen sensor while operating the exhaust oxygen sensor in the variable voltage mode during one or more of an engine start, after a number of travel miles, after a duration of engine operation, after a number of engine cycles, and the engine non-fueling condition.

7. The method of claim 5, wherein the engine non-fueling condition includes a deceleration fuel shut off.

8. The method of claim 1, wherein the output of the exhaust oxygen sensor which the EGR amount estimate is based on, is obtained while EGR is flowing from an exhaust passage to an intake passage, where the exhaust oxygen sensor is disposed in the exhaust passage.

9. The method of claim 8, further comprising determining a total water concentration in exhaust based on the output of the exhaust oxygen sensor and determining a water concentration in exhaust due to humidity and a fuel ethanol content based on the learned correction factor and estimating the EGR amount by subtracting the water concentration in exhaust due to humidity and fuel ethanol content from the total water concentration.

10. A method for an engine, comprising:
determining an amount of exhaust gas recirculation (EGR) flowing in the engine based on a first output of an exhaust oxygen sensor during operation in a variable voltage mode, where a reference voltage of the exhaust oxygen sensor is adjusted from a lower, first voltage to a higher, second voltage, with EGR flowing and a second output of the exhaust oxygen sensor during operation in the variable voltage mode without EGR flowing; and
adjusting engine operation based on the determined amount of EGR.

11. The method of claim 10, further comprising estimating a fuel ethanol content based on the second output of the exhaust oxygen sensor during a steady-state engine operating condition and inferring a first water concentration in engine exhaust gases based on the estimated fuel ethanol content.

12. The method of claim 11, further comprising estimating ambient humidity based on a third output of the exhaust oxygen sensor while operating in the variable voltage mode during an engine non-fueling condition and based on a dry air pumping current output of the exhaust oxygen sensor, the dry air pumping current estimated during one or more of an engine start, after a number of travel miles, after a duration of engine operation, after a number of engine cycles, and the engine non-fueling condition.

13. The method of claim 12, further comprising inferring a second water concentration in the exhaust based on the estimated ambient humidity.

14. The method of claim 13, further comprising determining the amount of EGR flowing in the engine by subtracting each of the first water concentration and the second water concentration from a total water concentration in the exhaust, the total water concentration determined based on the first output of the exhaust oxygen sensor.

15. The method of claim 10, further comprising, operating the exhaust oxygen sensor at only the first voltage, in a non-variable voltage mode, in response to a request to determine an air-fuel ratio of the engine, and adjusting engine operation based on an estimated air-fuel ratio, the estimated air-fuel ratio determined based on an output of the exhaust oxygen sensor operating in the non-variable voltage mode.

16. A system for an engine, comprising:
  an exhaust gas recirculation (EGR) system including an EGR passage coupling an exhaust passage with an intake passage, the EGR passage including an EGR valve;
  an exhaust oxygen sensor configured to operate in a variable voltage mode, where a reference voltage of the exhaust oxygen sensor is adjusted from a lower, first voltage to a higher, second voltage, and coupled to the exhaust passage; and
  a controller including computer readable instructions for:
    operating the exhaust oxygen sensor in the variable voltage mode while the EGR valve is closed to generate a first output;
    opening the EGR valve to circulate EGR and operating the exhaust oxygen sensor in the variable voltage mode to generate a second output; and
    adjusting engine operation based on an estimated amount of EGR, the estimated amount of EGR determined based on a difference between the second output and the first output.

17. The system of claim 16, wherein the controller includes further instructions for generating each of the first output and the second output during an engine idle condition.

18. The system of claim 16, wherein the controller includes further instructions for:
  operating the exhaust oxygen sensor in the variable voltage mode during an engine non-fueling condition and generating a third output of the exhaust oxygen sensor; and
  estimating ambient humidity based on the third output of the exhaust oxygen sensor and further based on a dry air pumping current output of the exhaust oxygen sensor.

19. The system of claim 18, wherein the controller includes further instructions for estimating the amount of EGR flowing in the engine based on a difference between the second output and each of the first and third outputs.

20. The system of claim 18, wherein the controller includes further instructions for estimating the dry air pumping current based on ratio between a first pumping current generated when the exhaust oxygen sensor is operated at the first voltage, and a second pumping current of the exhaust oxygen sensor generated when the exhaust oxygen sensor is operated at the second voltage.

* * * * *